United States Patent
Fujii et al.

(10) Patent No.: US 8,305,231 B2
(45) Date of Patent: Nov. 6, 2012

(54) GAS APPLIANCE MONITORING APPARATUS

(75) Inventors: Yuuji Fujii, Nara (JP); Hirozumi Nakamura, Nara (JP); Shigeru Murakami, Nara (JP); Sumiko Murakami, legal representative, Nara (JP)

(73) Assignee: Panasonic Corporation, Osaka (JP)

( * ) Notice: Subject to any disclaimer, the term of this patent is extended or adjusted under 35 U.S.C. 154(b) by 513 days.

(21) Appl. No.: 12/532,562

(22) PCT Filed: Mar. 21, 2008

(86) PCT No.: PCT/JP2008/000685
§ 371 (c)(1),
(2), (4) Date: Sep. 22, 2009

(87) PCT Pub. No.: WO2008/117531
PCT Pub. Date: Oct. 2, 2008

(65) Prior Publication Data
US 2010/0188261 A1   Jul. 29, 2010

(30) Foreign Application Priority Data
Mar. 23, 2007 (JP) .............................. P2007-076332
Mar. 23, 2007 (JP) .............................. P2007-076333

(51) Int. Cl.
*G08B 23/00* (2006.01)
(52) U.S. Cl. .............. 340/870.02; 340/870.07; 700/282; 73/195; 73/197
(58) Field of Classification Search ............. 340/870.07, 340/870.02; 73/195, 197; 700/282
See application file for complete search history.

(56) References Cited

U.S. PATENT DOCUMENTS

| 3,717,858 A | * | 2/1973 | Hadden ..................... 340/870.2 |
| 2004/0128034 A1 | * | 7/2004 | Lenker et al. ................ 700/282 |

FOREIGN PATENT DOCUMENTS

| JP | 03-236513 A | 10/1991 |
| JP | 07-044239 A | 2/1995 |
| JP | 08-178195 A | 7/1996 |
| JP | 10-073466 A | 3/1998 |
| JP | 10-207533 A | 8/1998 |
| JP | 2001-283367 A | 10/2001 |
| JP | 2006-163681 A | 6/2006 |
| JP | 2006-200776 A | 8/2006 |
| JP | 2007-003275 A | 1/2007 |
| JP | 2007-024809 A | 2/2007 |

OTHER PUBLICATIONS

International Search Report for International Application No. PCT/JP2008/000685, dated May 13, 2008, 2 pages.

* cited by examiner

*Primary Examiner* — Jean B Jeanglaude
(74) *Attorney, Agent, or Firm* — Brinks Hofer Gilson & Lione

(57) ABSTRACT

A gas appliance monitoring apparatus includes a flow rate measurement unit for measuring the gas flow rate, a gas shut-off valve for shutting off a gas flow path at the abnormal time, an information storage unit for storing measurement results of the flow rate measurement unit, a wireless module for transmitting and receiving information, and a communication switch unit for switching a communication frequency band. The wireless module is integrated with a control circuit board forming the flow rate measurement unit and is housed in a gas meter. The wireless module has at least a communication frequency band with a base station and a communication frequency band with a plurality of gas appliances, and transmits an operation start signal detected by a specific gas appliance as appliance information using an appliance wireless module. The continuous use time of the specific appliance is detected or is changed based on the information.

16 Claims, 13 Drawing Sheets

FIG. 9
(a)
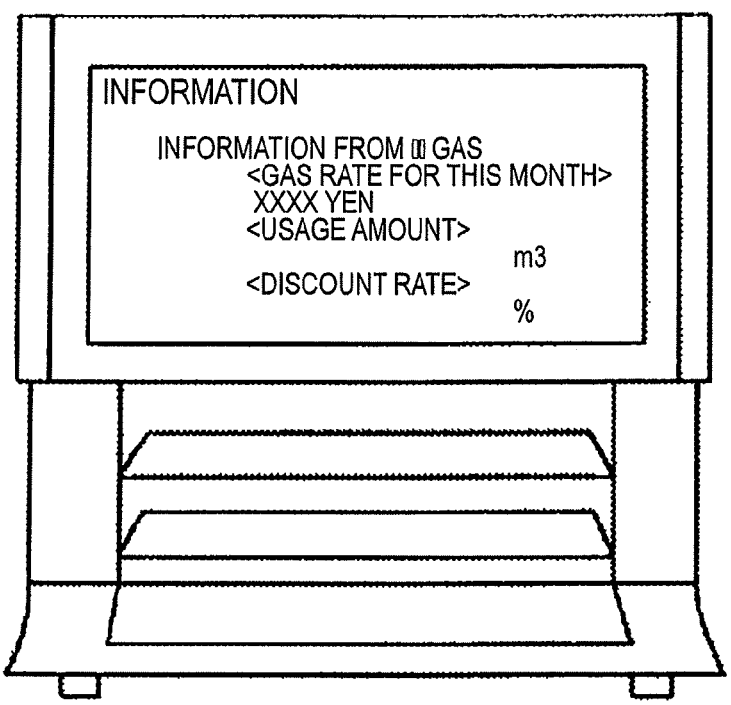
(b)
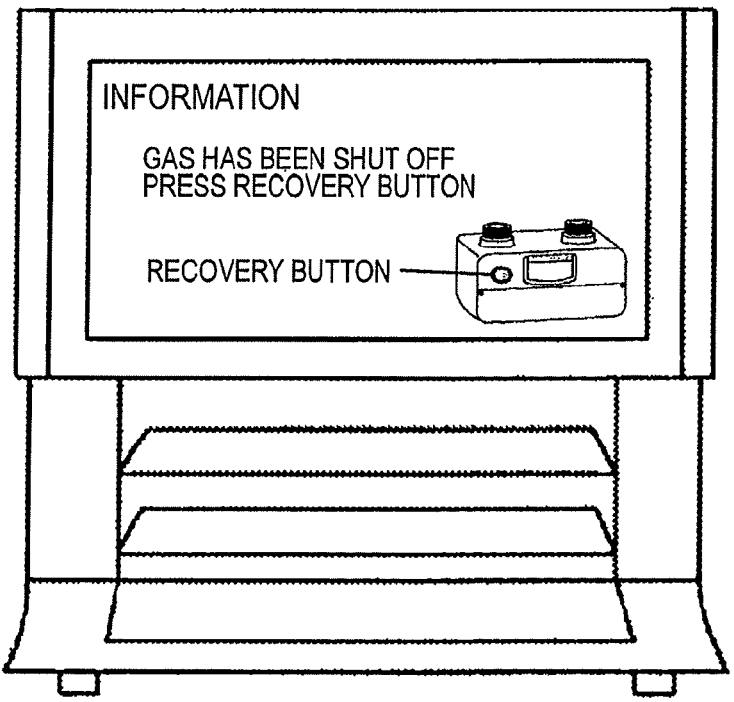

GAS APPLIANCE MONITORING APPARATUS

TECHNICAL FIELD

This invention relates to an apparatus for determining a plurality of gas appliances connected to gas piping after passing through a gas meter and monitoring the use state of gas individually.

BACKGROUND ART

Conventionally, as this kind of gas monitoring apparatus, there are an apparatus including a flow rate measurement unit for outputting a signal in response to the gas rate passing through a gas meter placed in a gas supplying pipe line, an individual gas appliance flow rate computation unit for calculating a change flow rate of the gas rate passing through the gas meter according to the signal from the flow rate measurement unit and classifying into the gas rate for each individual gas appliance, a sensor unit for providing input signals other than the change flow rate, such as outdoor air temperature, calendar information, and use start time information, for example, and a composite computation unit for compounding the information provided from the individual gas appliance flow rate computation unit and the sensor unit and determining the used gas appliance (for example, refer to patent document 1) and an apparatus including a sound producing unit each being installed in the individual gas flow path of each gas appliance for producing a monitor sound at a predetermined frequency corresponding to the individual gas appliance in the strength responsive to the gas flow rate and a monitor unit for monitoring the use state of the individual gas appliance based on the monitor sound produced by each sound producing unit (for example, refer to patent document 2).

As an apparatus for limiting the continuous use time to prevent an accident caused by forgetting to turn off a gas appliance, etc., an apparatus for setting the continuous use time in response to the flow rate and shutting off gas when the continuous use time has elapsed is available (for example, patent document 3).

Patent document 1: Japanese Patent Laid-Open No. H03-236513A
Patent document 2: Japanese Patent Laid-Open No. H08-178195A
Patent document 3: Japanese Patent Laid-Open No. H07-44239A

DISCLOSURE OF THE INVENTION

Problems to be Solved by the Invention

However, the gas appliance monitoring apparatus disclosed in the patent documents described above need to be provided with a gas appliance determination unit involving a complicated control circuit; particularly in patent document 1, the individual gas appliance flow rate computation unit for classifying into the gas rate for each individual gas appliance from the change flow rate of the gas rate passing through the gas meter is provided and further various pieces of sensor information to determine the use environment are compounded and the used gas appliance is estimated. Considering the need for the complicated circuit configuration, a problem still remains in certainty to determine the used gas appliance.

The apparatus in patent document 2 produces a monitor sound at a frequency responsive to the magnitude of the gas flow rare flowing into each gas appliance, collects the monitor sound, and determines the used gas appliance. Thus, although certainty can be improved in that the used gas appliance is determined based on the information output from the individual gas appliance, there is a problem in that a whistle device for producing a sound responsive to the flow rate, a microphone for collecting the sound, and an analysis circuit are necessary and an extremely complicated circuit configuration is required.

In the apparatus in patent document 3, the continuous use time is uniformly set in response to the gas flow rate regardless of the type of gas appliance and the use time corresponding to the unique use of each gas appliance is not set; for example, a newest gas appliance with a full safety function and a gas appliance of 20 years past with a poor safety function, although they are gas appliances, are limited as the same use time if the flow rate range is the same. If the use time is limited with the newest gas appliance as the reference, the prevention time of forgetting to turn off the gas appliance of 20 years past is prolonged and the risk increases. In contrast, if the use time is limited with the gas appliance of 20 years past as the reference, an early turning-off phenomenon of the newest gas appliance occurs; this is a problem.

The invention is intended for solving the above-mentioned problems and it is an object of the invention to provide a gas appliance monitoring apparatus wherein an appliance detection unit capable of detecting the operation start of a gas appliance without receiving a signal from a gas appliance controller and an appliance wireless module capable of transmitting operation start information to a gas meter are provided and are housed in a gas appliance, the gas appliance monitoring apparatus capable of monitoring the appropriate use time responsive to an already existing old gas appliance by monitoring the continuous use time of a specific gas appliance based on information from the appliance wireless module.

Means for Solving the Problems

To solve the problems in the related arts described above, a gas appliance monitoring apparatus of the invention is a gas appliance monitoring apparatus for monitoring the use state of a plurality of gas appliances connected to piping after passing through a gas meter, the gas appliance monitoring apparatus installing a wireless module capable of transmitting and receiving directly to and from a plurality of parties using a communication line other than a telephone line, wherein the gas meter includes a flow rate measurement unit for measuring a gas flow rate, a gas shut-off valve for shutting off a gas flow path at an abnormal time, a control circuit for performing predetermined processing based on a measurement result of the flow rate measurement unit and outputting a flow rate information, a meter wireless module for transmitting and receiving information to and from a plurality of parties, and a communication switch unit for switching a communication frequency band depending on the parties, wherein the meter wireless module has at least a communication frequency band with a base station and a communication frequency band with a specific gas appliance, wherein the specific gas appliance is provided with an appliance information transmitter for detecting an operation start of the appliance and transmitting appliance information to the gas meter, wherein the appliance information transmitter includes an appliance detection unit for detecting an operation start of the appliance without receiving a signal from a gas appliance controller and an appliance wireless module for transmitting an appliance operation start signal from the appliance detection unit to the gas meter in a predetermined communication frequency band, wherein the control circuit has a continuous use time monitor unit for monitoring a continuous operation time of the appliance based on the flow rate information, a by-flow-rate-range continuous use time storage unit presetting and storing the continuously usable time by a flow rate range, a specific appliance monitor unit for monitoring a continuous operation time of the specific gas appliance based on the appliance information transmitted from the appliance information transmitter and the flow rate information, and a specific appliance use time storage unit presetting and storing a continuously usable time of the specific gas appliance, and wherein when the continuous operation time monitored by the continuous use time monitor unit reaches a stored value in the by-flow-rate-range continuous use time storage unit, a predetermined processing mode is executed and when the continuous operation time monitored by the specific appliance monitor unit reaches a stored value in the specific appliance use time storage unit, the gas shut-off valve is operated on a top-priority basis for stopping supply of the gas and the meter wireless module is used to transmit the continuous use time passage information at least to the base station.

According to the invention described above, the wireless module capable of communicating with the base station using a wireless communication unit other than a telephone line and the wireless module capable of receiving appliance information from a plurality of gas appliances are integrally built in the control circuit board in the gas meter, so that communications with the base station are made possible without using a telephone line simply by installing the gas meter, various commands from the base station can be smoothly transmitted without receiving the effect of the congestion state of the line, appliance information containing use information from a specific gas appliance, particularly a gas appliance of an old type which needs to be sufficiently monitored among the gas appliances connected to the piping after passing through the gas meter can be acquired, a defective condition that communications with the center cannot be conducted because of congestion of a telephone line as before can be solved, and information concerning the gas appliance of the old type used in a home can acquired in real time and reliably.

Since use presence/absence information can also be acquired at the same time by acquired specific gas appliance information, the flow rate value found by the flow rate measurement unit can be monitored in association with the gas appliance information and safety service for discriminating between the newest gas appliance and the gas appliance of the old type can be provided.

Further, the continuous operation time involving actual combustion can be monitored by acquired specific gas appliance information and is compared with the monitor time by preset specific gas appliance, whereby appropriate continuous use time can be determined for a gas appliance of an old type with an insufficient safety function and the determination result can be reported to the necessary party such as the base station, so that a dangerous state accompanying the long-time abnormal use situation caused by forgetting to turn off the gas appliance, etc., can be prevented reliably.

To solve the problems in the related arts described above, a gas appliance monitoring apparatus of the invention is a gas appliance monitoring apparatus for monitoring the use state of a plurality of gas appliances connected to piping after passing through a gas meter, the gas appliance monitoring apparatus installing a wireless module capable of transmitting and receiving directly to and from a plurality of parties using a communication line other than a telephone line, wherein the gas meter includes a flow rate measurement unit for measuring a gas flow rate, a gas shut-off valve for shutting off a gas flow path at the abnormal time, a control circuit for performing predetermined processing based on the measurement result of the flow rate measurement unit and outputting flow rate information, a meter wireless module for transmitting and receiving information to and from a plurality of parties, and a communication switch unit for switching a communication frequency band depending on the parties, wherein the meter wireless module has at least a communication frequency band with a base station and a communication frequency band with a specific gas appliance, wherein the specific gas appliance is provided with an appliance information transmitter for detecting the operation start of the appliance and transmitting appliance information to the gas meter, wherein the appliance information transmitter includes an appliance detection unit for detecting the operation start of the appliance without receiving a signal from a gas appliance controller and an appliance wireless module for transmitting an appliance operation start signal from the appliance detection unit to the gas meter in a predetermined communication frequency band, wherein the control circuit has a continuous use time monitor unit for monitoring the continuous operation time of the appliance based on the flow rate information, a by-flow-rate-range continuous use time storage unit presetting and storing the continuously usable time by flow rate range, and a monitor level change unit for changing the stored value in the by-flow-rate-range continuous use time storage unit based on the appliance information transmitted from the appliance information transmitter, and wherein when the continuous operation time monitored by the continuous use time monitor unit reaches the stored value in a the by-flow-rate-range continuous use time storage unit, a predetermined processing mode is executed and when the monitor level change unit changes the stored value, the gas appliance is monitored using the post-changed stored value until a change reset processing is executed.

According to the configuration described above, the continuous operation time involving actual combustion can be monitored by acquired specific gas appliance information and the allowable time of the continuously usable time in the time period during which the gas appliance of the old type is used is restricted, whereby appropriate continuous use time can be determined for the gas appliance of the old type with an insufficient safety function and the monitor level of any other gas appliance in the time period is also changed and is strictly monitored, whereby safety monitor of all gas appliances in the time period during which the gas appliance of the old type is used can be set under an appropriate condition and the determination result can be reported to the necessary party such as the base station, so that a dangerous state accompanying the long-time abnormal use situation caused by forgetting to turn off the gas appliance, etc., can be prevented reliably.

Advantages of the Invention

In the gas appliance monitoring apparatus of the invention, communications with the base station are made possible without using a telephone line simply by installing the gas meter, various commands from the base station can be smoothly transmitted without receiving the effect of the congestion state of the line, appliance information containing use information from a specific gas appliance, particularly a gas appliance of an old type which needs to be sufficiently monitored among the gas appliances connected to the piping after passing through the gas meter can be acquired, a defective condition that communications with the center cannot be conducted because of congestion of a telephone line as before can be solved, and information concerning the gas appliance of the old type used in a home can acquired in real time and reliably.

Since use presence/absence information can also be acquired at the same time by acquired specific gas appliance information, the flow rate value found by the flow rate measurement unit can be monitored in association with the gas appliance information and safety service for discriminating between the newest gas appliance and the gas appliance of the old type can be provided.

Further, the continuous operation time involving actual combustion can be monitored by acquired specific gas appliance information and is compared with the monitor time by preset specific gas appliance, whereby appropriate continuous use time can be determined for a gas appliance of an old type with an insufficient safety function and the determination result can be reported to the necessary party such as the base station, so that a dangerous state accompanying the long-time abnormal use situation caused by forgetting to turn off the gas appliance, etc., can be prevented reliably.

Further, the continuous operation time involving actual combustion can be monitored by acquired specific gas appliance information and the allowable time of the continuously usable time in the time period during which the gas appliance of the old type is used is restricted, whereby appropriate continuous use time can be determined for the gas appliance of the old type with an insufficient safety function and the monitor level of any other gas appliance in the time period is also changed and is strictly monitored, whereby safety monitor of all gas appliances in the time period during which the gas appliance of the old type is used can be set under an appropriate condition and the determination result can be reported to the necessary party such as the base station, so that a dangerous state accompanying the long-time abnormal use situation caused by forgetting to turn off the gas appliance, etc., can be prevented reliably.

BRIEF DESCRIPTION OF THE DRAWINGS

FIG. 9 (a) is a drawing to show a rate information display form in the specific terminal and (b) is a drawing to show a recovery information display form in the specific terminal.

DESCRIPTION OF REFERENCE NUMERALS

Figure 1:
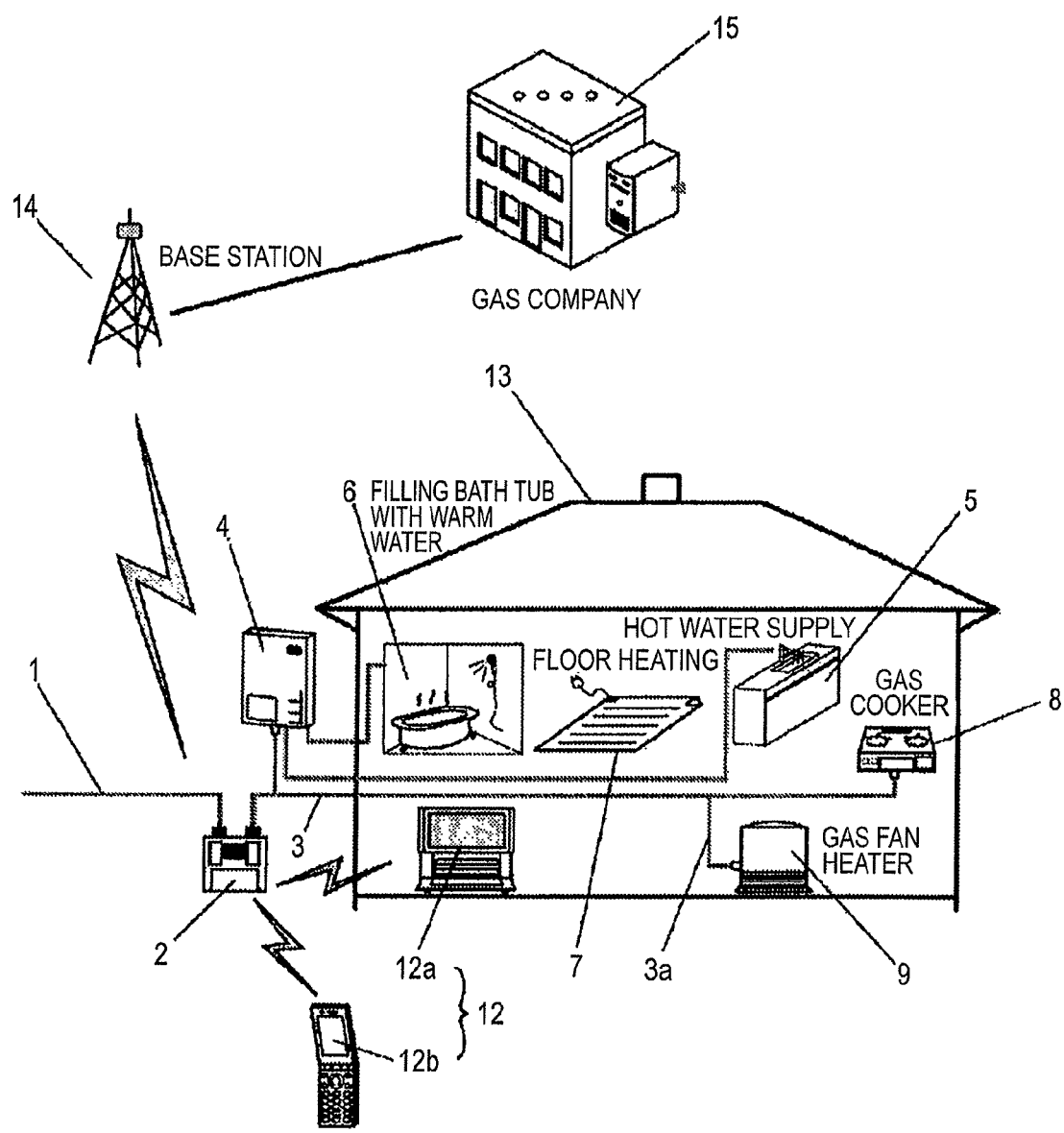
FIG. 1 is a configuration drawing to show a communication mode of a gas appliance monitoring apparatus in an embodiment of the invention.

2 Gas meter
2c Gas shut-off valve
10a Control circuit
10b Information storage unit
10c Communication switch unit
10f Specific appliance monitor unit
10g Specific appliance use time storage unit
11 Wireless module
11a Wide area communication wireless module
11b Area communication wireless module
11d Appliance wireless module
12 Specific terminal
14 Base station
17 Flow rate measurement unit
22 Appliance detection unit
26 Appliance information transmitter
27 Identification code change unit
33 Appliance determination unit
34 Flow rate change detection unit
35 Operation time measurement unit
36 By-appliance operation time storage unit
37 By-appliance operation time determination unit
38 By-appliance continuous use time storage table
39 Comparison unit
40 Flow rate range detection unit
41 Operation time measurement unit
42 By-flow-rate-range operation time storage unit
43 by-flow-rate-range operation time determination unit
44 Continuous use time monitor unit
45 By-flow-rate-range use time storage table
46 Comparison unit
47 By-flow-rate-range use time storage unit
49 Monitor level change unit

BEST MODE FOR CARRYING OUT THE INVENTION

A first aspect of the invention provides a gas appliance monitoring apparatus for monitoring the use state of a plurality of gas appliances connected to piping after passing through a gas meter, the gas appliance monitoring apparatus installing a wireless module capable of transmitting and receiving directly to and from a plurality of parties using a communication line other than a telephone line, wherein the gas meter includes a flow rate measurement unit for measuring a gas flow rate, a gas shut-off valve for shutting off a gas flow path at the abnormal time, a control circuit for performing predetermined processing based on the measurement result of the flow rate measurement unit and outputting flow rate information, a meter wireless module for transmitting and receiving information to and from a plurality of parties, and a communication switch unit for switching a communication frequency band depending on the parties, wherein the meter wireless module is integrated with the control circuit and is housed in the gas meter and has at least a communication frequency band with a base station and a communication frequency band with a specific gas appliance, wherein the specific gas appliance is provided with an appliance information transmitter for detecting the operation start of the appliance and transmitting appliance information to the gas meter, wherein the appliance information transmitter includes an appliance detection unit for detecting the operation start of the appliance without receiving a signal from a gas appliance controller and an appliance wireless module for transmitting an appliance operation start signal from the appliance detection unit to the gas meter in a predetermined communication frequency band, wherein the control circuit has a continuous use time monitor unit for monitoring the continuous operation time of the appliance based on the flow rate information, a by-flow-rate-range continuous use time storage unit presetting and storing the continuously usable time by flow rate range, a specific appliance monitor unit for monitoring the continuous operation time of the specific gas appliance based on the appliance information transmitted from the appliance information transmitter and the flow rate information, and a specific appliance use time storage unit presetting and storing the continuously usable time of the specific gas appliance, and wherein when the continuous operation time monitored by the continuous use time monitor unit reaches the stored value in the by-flow-rate-range continuous use time storage unit, a predetermined processing mode is executed and when the continuous operation time monitored by the specific appliance monitor unit reaches the stored value in the specific appliance use time storage unit, the gas shut-off valve is operated on a top-priority basis for stopping supply of the gas and the meter wireless module is used to transmit the continuous use time passage information at least to the base station.

The wireless module capable of communicating with the base station using a wireless communication unit other than a telephone line and the wireless module capable of receiving appliance information from a plurality of gas appliances are integrally built in the control circuit board in the gas meter, so that communications with the base station are made possible without using a telephone line simply by installing the gas meter, various commands from the base station can be smoothly transmitted without receiving the effect of the congestion state of the line, appliance information containing use information from a specific gas appliance, particularly a gas appliance of an old type which needs to be sufficiently monitored among the gas appliances connected to the piping after passing through the gas meter can be acquired, a defective condition that communications with the center cannot be conducted because of congestion of a telephone line as before can be solved, and information concerning the gas appliance of the old type used in a home can acquired in real time and reliably.

Since use presence/absence information can also be acquired at the same time by acquired specific gas appliance information, the flow rate value found by the flow rate measurement unit can be monitored in association with the gas appliance information and safety service for discriminating between the newest gas appliance and the gas appliance of the old type can be provided.

Further, the continuous operation time involving actual combustion can be monitored by acquired specific gas appliance information and is compared with the monitor time by preset specific gas appliance, whereby appropriate continuous use time can be determined for a gas appliance of an old type with an insufficient safety function and the determination result can be reported to the necessary party such as the base station, so that a dangerous state accompanying the long-time abnormal use situation caused by forgetting to turn off the gas appliance, etc., can be prevented reliably.

A second aspect of the invention provides a gas appliance monitoring apparatus for monitoring the use state of a plurality of gas appliances connected to piping after passing through a gas meter, the gas appliance monitoring apparatus installing a wireless module capable of transmitting and receiving directly to and from a plurality of parties using a communication line other than a telephone line, wherein the gas meter includes a flow rate measurement unit for measuring a gas flow rate, a gas shut-off valve for shutting off a gas flow path at the abnormal time, a control circuit for performing predetermined processing based on the measurement result of the flow rate measurement unit and outputting flow rate information, a meter wireless module for transmitting and receiving information to and from a plurality of parties, and a communication switch unit for switching a communication frequency band depending on the parties, wherein the meter wireless module is integrated with the control circuit and is housed in the gas meter and has at least a communication frequency band with a base station and a communication frequency band with a specific gas appliance, wherein the specific gas appliance is provided with an appliance information transmitter for detecting the operation start of the appliance and transmitting appliance information to the gas meter, wherein the appliance information transmitter includes an appliance detection unit for detecting the operation start of the appliance without receiving a signal from a gas appliance controller and an appliance wireless module for transmitting an appliance operation start signal from the appliance detection unit to the gas meter in a predetermined communication frequency band, wherein the control circuit has a continuous use time monitor unit for monitoring the continuous operation time of the appliance based on the flow rate information, a by-flow-rate-range continuous use time storage unit presetting and storing the continuously usable time by flow rate range, and a monitor level change unit for changing the stored value in the by-flow-rate-range continuous use time storage unit based on the appliance information transmitted from the appliance information transmitter, and wherein when the continuous operation time monitored by the continuous use time monitor unit reaches the stored value in the by-flow-rate-range continuous use time storage unit, a predetermined processing mode is executed and when the monitor level change unit changes the stored value, the gas appliance is monitored using the post-changed stored value until a change reset processing is executed.

According to the configuration described above, the continuous operation time involving actual combustion can be monitored by acquired specific gas appliance information and the allowable time of the continuously usable time in the time period during which the gas appliance of the old type is used is restricted, whereby appropriate continuous use time can be determined for the gas appliance of the old type with an insufficient safety function and the monitor level of any other gas appliance in the time period is also changed and is strictly monitored, whereby safety monitor of all gas appliances in the time period during which the gas appliance of the old type is used can be set under an appropriate condition and the determination result can be reported to the necessary party such as the base station, so that a dangerous state accompanying the long-time abnormal use situation caused by forgetting to turn off the gas appliance, etc., can be prevented reliably.

A third aspect of the invention is characterized by the fact that the meter wireless module conducts communications using a communication frequency band different from a communication wireless module with the base station and a communication wireless module with the specific gas appliance, and that the communication wireless module with the specific gas appliance is an area communication wireless module having a specified low power wireless communication frequency band and the communication wireless module with the base station is a wide area communication wireless module having a wide area communication frequency band.

The wide area communication wireless module capable of communicating with the base station as carrier direct and the area communication wireless module capable of communicating within a predetermined range using the specified low power wireless communication frequency band are integrated with the control circuit board and information is transmitted to the base station using a communication line other than a telephone line and information is transmitted to the specific gas appliance using the specified low power wireless communication frequency band, so that information concerning the specific gas appliance used in a home can acquired in real time and reliably, it is made possible to execute by-appliance management of the gas flow rate based on the acquired information with good accuracy, the by-appliance management result can be transmitted directly to the base station simply by switching the meter wireless module, and it is also possible to construct a rational communication unit.

A fourth aspect of the invention is characterized by the fact that the area communication wireless module can also conduct communications with a specific terminal in addition to communications with the specific gas appliance and when the continuous use time passage information is originated, also transmits it to the specific terminal.

Using the area communication wireless module incorporated in the gas meter, communications can also be conducted with a specific terminal such as a TV or a mobile telephone, whereby it is made possible to transmit the continuous use time passage information, the fact that the continuous use time has elapsed and the gas shut-off valve operates can be displayed on the screen of the TV or the mobile telephone, and the customer can be prompted to exercise care.

A fifth aspect of the invention is characterized by the fact that the appliance detection unit includes a discharge noise detection unit for detecting discharge noise for ignition of the specific gas appliance and an operation start signal conversion unit for converting a signal from the discharge noise detection unit into an appliance operation start signal and outputting the signal to the appliance wireless module.

As the appliance information of the gas appliance, discharge noise occurring accompanying the discharge operation of the igniter operating when the gas appliance starts the operation is detected without receiving a signal from the gas appliance controller and is converted into an operation start signal indicating the start of the ignition operation of the appliance from the discharge noise and the signal is output to the appliance wireless module, so that the appliance detection unit can be formed independently of the gas appliance controller and can be attached to an already existing gas appliance without any change, and can be simply set in a location where discharge noise can be detected, thereby detecting the use start of the appliance.

A sixth aspect of the invention is characterized by the fact that the appliance detection unit includes a temperature change detection unit for detecting temperature change occurring with the operation of the specific gas appliance and an operation start signal conversion unit for converting a signal from the temperature change detection unit into an appliance operation start signal and outputting the signal to the appliance wireless module.

As the appliance information of the gas appliance, temperature change occurring accompanying the combustion operation start of the gas appliance is detected without receiving a signal from the gas appliance controller and is converted into an operation start signal indicating the start of the combustion of the appliance from the temperature change and the signal is output to the appliance wireless module, so that the appliance detection unit can be formed independently of the gas appliance controller and can be attached to an already existing gas appliance, particularly to the gas appliance of the old type without any change, and can be simply set in a location where temperature change can be detected, thereby detecting the use start of the appliance.

A seventh aspect of the invention is characterized by the fact that the appliance wireless module includes an operation start signal determination unit for determining whether or not the operation start signal from the appliance detection unit is normal, an identification code change unit for setting or changing a unique identification code for identifying each appliance, and an appliance information transmission unit for transmitting the operation start signal and appliance information to which the identification code is given to the gas meter if the determination result of the operation start signal determination unit is normal.

A unique identification code is given by type of specific gas appliance used in a home and the operation start signal is transmitted together with the identification code, whereby information can be reliably provided as to use of which appliance is started and the identification code change unit capable of changing or setting the identification code by appliance as desired is included, so that if the appliance is changed by replacing, etc., the identification code needs only to be changed and reuse or sharing is also possible and an extremely effective appliance information transmission unit can be provided.

An eighth aspect of the invention is characterized by the fact that the specific appliance monitor unit includes an appliance determination unit for determining which gas appliance is used when the appliance information is transmitted from the appliance information transmitter, a flow rate change detection unit for detecting decrease side flow rate change from increase side flow rate change based on the flow rate information at the time, and an operation time measurement unit for measuring the time.

The flow rate information corresponding to the appliance information transmitted from the appliance information transmitter, namely, the time from an increase in the flow rate with use of the appliance to a decrease in the flow rate with the use stop of the appliance is measured and is monitored by appliance as the continuous operation time of the appliance, whereby the continuous use time of the appliance involving actual combustion can be monitored with good accuracy.

A ninth aspect of the invention is characterized by the fact that the specific appliance use time storage unit includes a continuously usable time storage table storing the continuously usable time varying depending on the type of specific gas appliance in an operation time table of a plurality of stages and a comparison unit for making a comparison between the continuous operation time monitored by the specific appliance monitor unit and the stored value in the storage table and outputs a signal to the wide area communication wireless module or/and the area communication wireless module when the continuous operation time exceeds the stored value.

The continuously usable time is stored as an operation time table of a plurality of stages by type of specific gas appliance and a comparison is made between the stored value and the actual operation time, whereby the specific gas appliance can be monitored finely and it is made possible to transmit the continuous use time passage information to a necessary location using the wide area communication wireless module and the area communication wireless module incorporated in the gas meter.

A tenth aspect of the invention is characterized by the fact that the monitor level change unit includes an appliance determination unit for determining which gas appliance is used when the appliance information is transmitted from the appliance information transmitter and a flow rate change detection unit for detecting decrease side flow rate change from increase side flow rate change based on the flow rate information at the time.

The flow rate information corresponding to the appliance information transmitted from the appliance information transmitter, namely, an increase in the flow rate with use of the appliance and a decrease in the flow rate with the use stop of the appliance are detected and it is determined that the specific gas appliance is used according to the detection signal and the monitor level is changed, whereby the monitor level is regulated strictly during the use time period of the specific gas appliance involving actual combustion, so that the monitor level in the time period during which the gas appliance of the old type with an insufficient safety function is used can be changed to an appropriate value.

An eleventh aspect of the invention is characterized by the fact that the by-flow-rate-range continuous use time storage unit includes a continuously usable time storage table storing the continuously usable time corresponding to the specific gas appliance based on the appliance information of the appliance determination unit and increase side flow rate change information of the flow rate change detection unit as an operation time table and a comparison unit for making a comparison between the continuous operation time monitored by the continuous use time monitor unit and the stored value in the storage table and outputs a signal to the wide area communication wireless module or/and the area communication wireless module when the continuous operation time exceeds the stored value.

When use of the specific gas appliance is acknowledged, change is made to the continuously usable time storage table corresponding thereto and a comparison is made between the stored value and the actual operation time, whereby all gas appliances including the specific gas appliance can be monitored according to strict determination, the monitor level in the time period during which the gas appliance of the old type with an insufficient safety function is used can be raised, and it is made possible to transmit the continuous use time passage information to a necessary location using the wide area communication wireless module and the area communication wireless module incorporated in the gas meter.

Embodiments of the invention will be discussed below with reference to the accompanying drawings: The invention is not limited by the embodiments.

Figure 2:
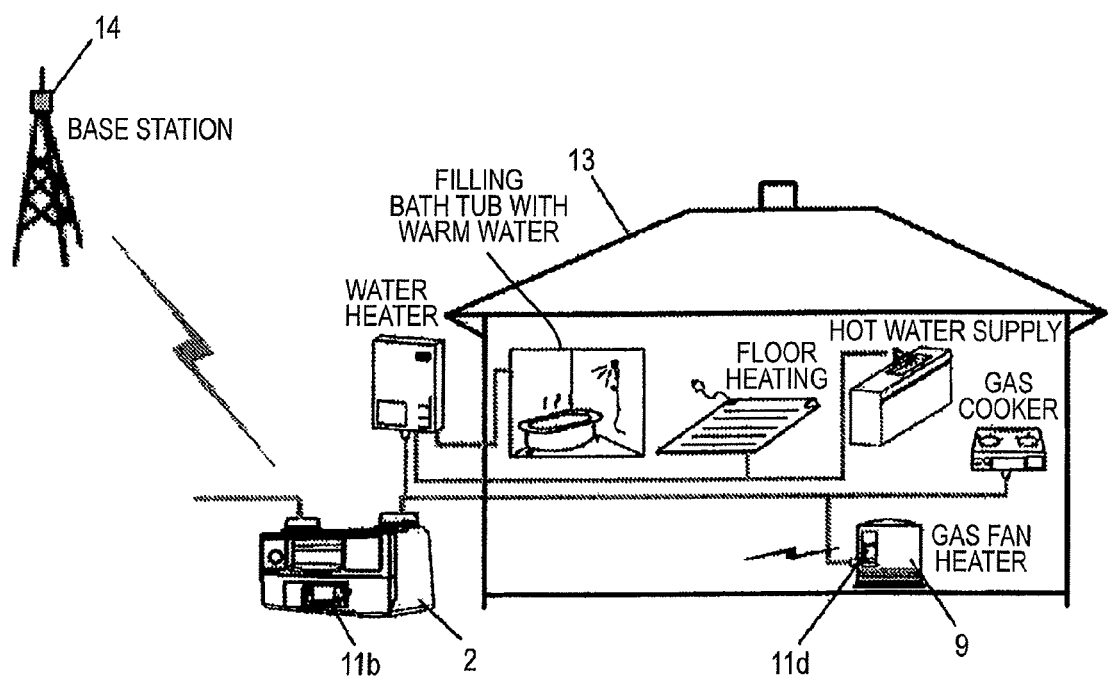
FIG. 2 is a drawing to show a communication mode with various gas appliances in the gas appliance monitoring apparatus.
Figure 3:
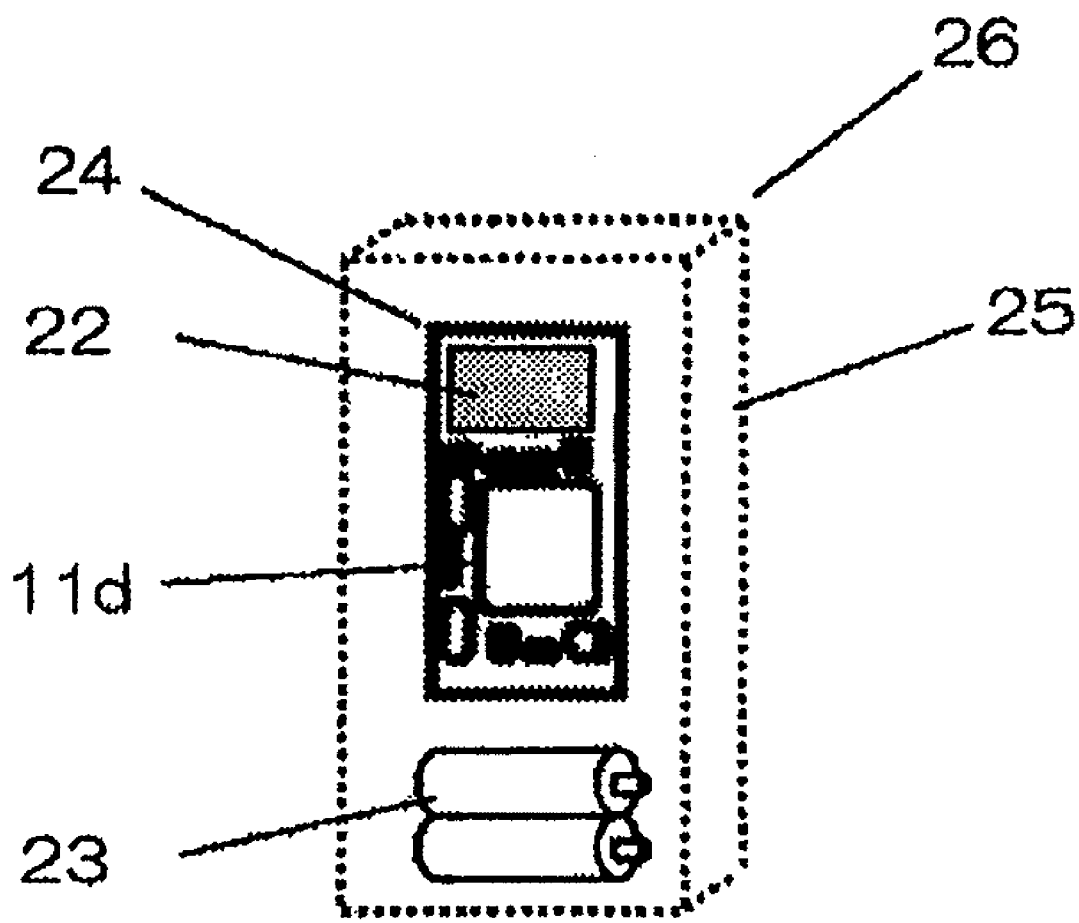
FIG. 3 is a configuration drawing of an appliance wireless module in the gas appliance monitoring apparatus.
Figure 4:
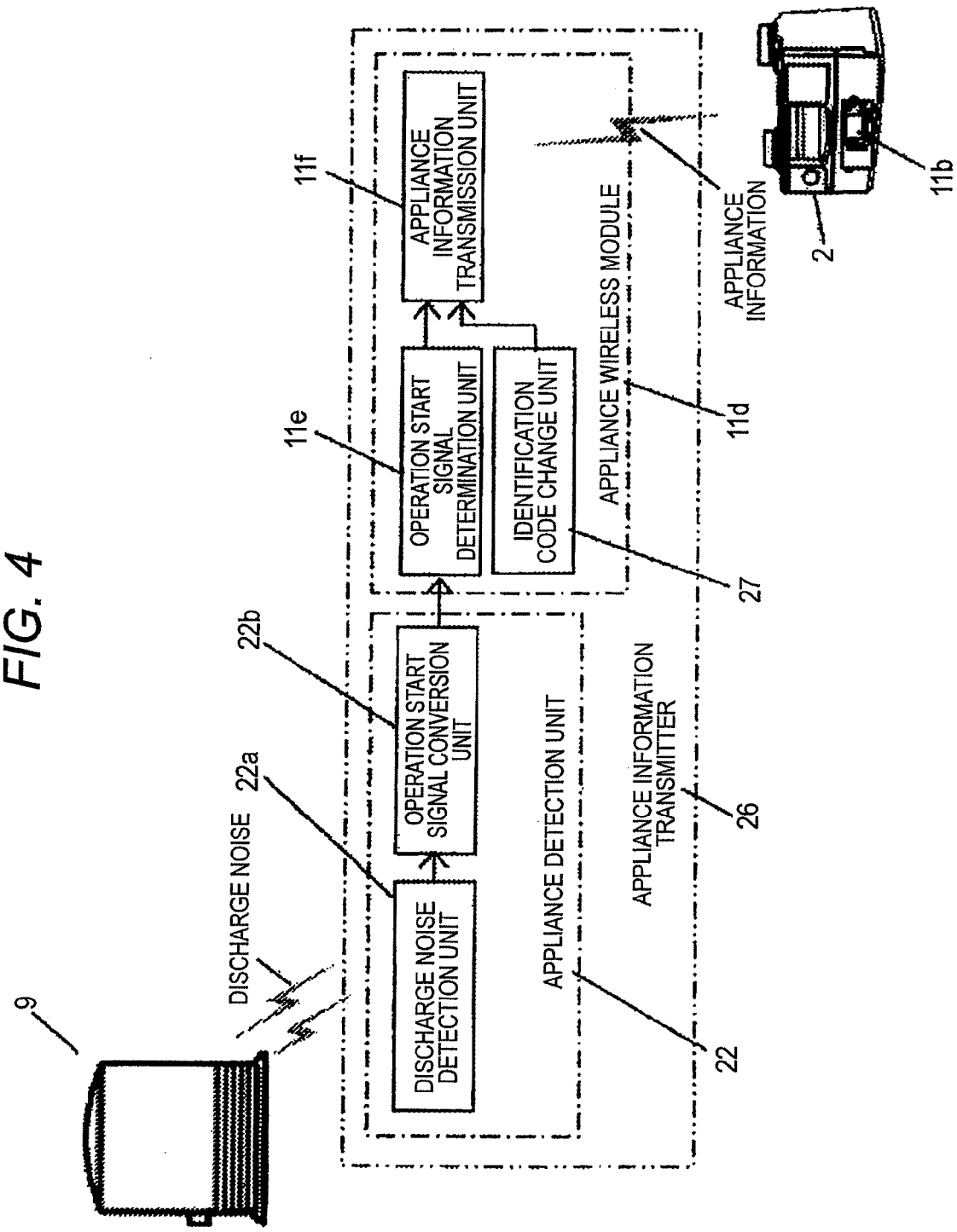
FIG. 4 is a control block diagram of an appliance detection unit in the gas appliance monitoring apparatus.
Figure 5:
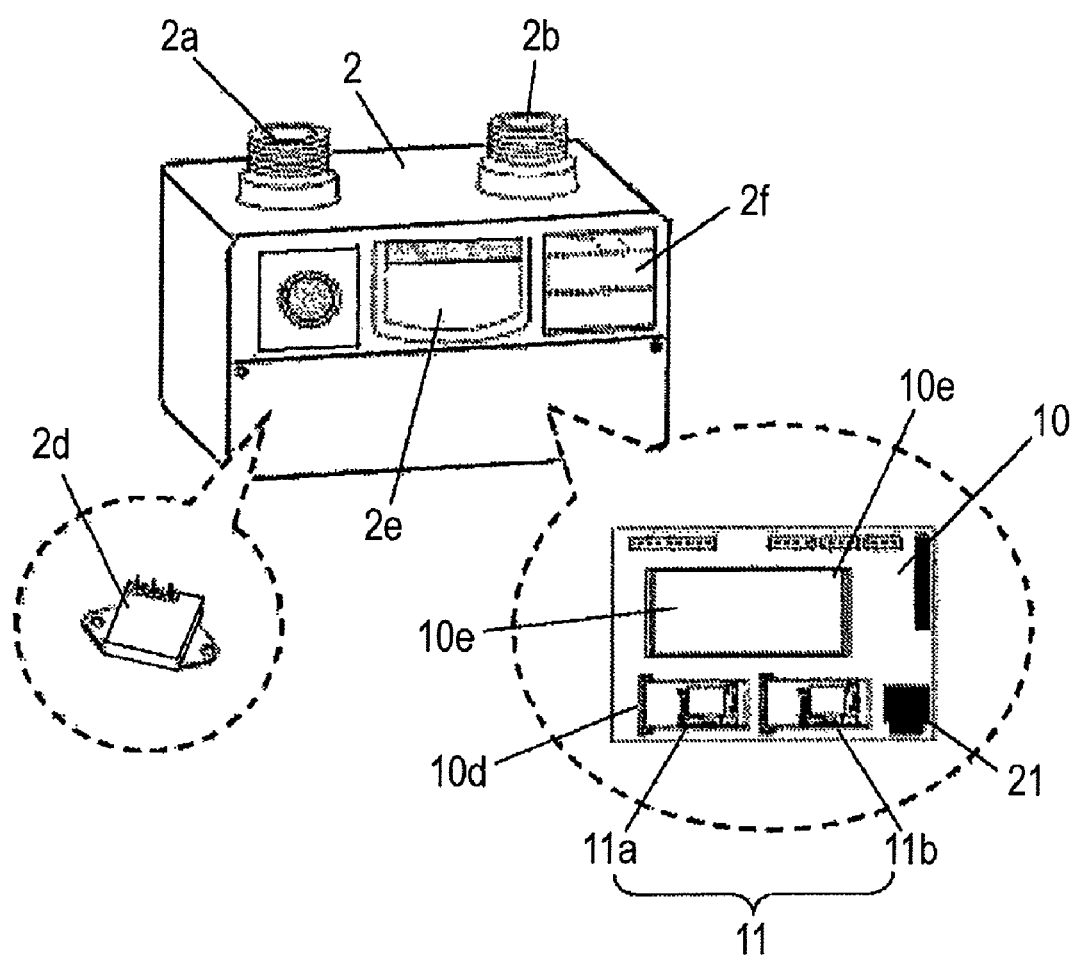
FIG. 5 is a drawing to show the appearance and the components of the gas appliance monitoring apparatus.
Figure 6:
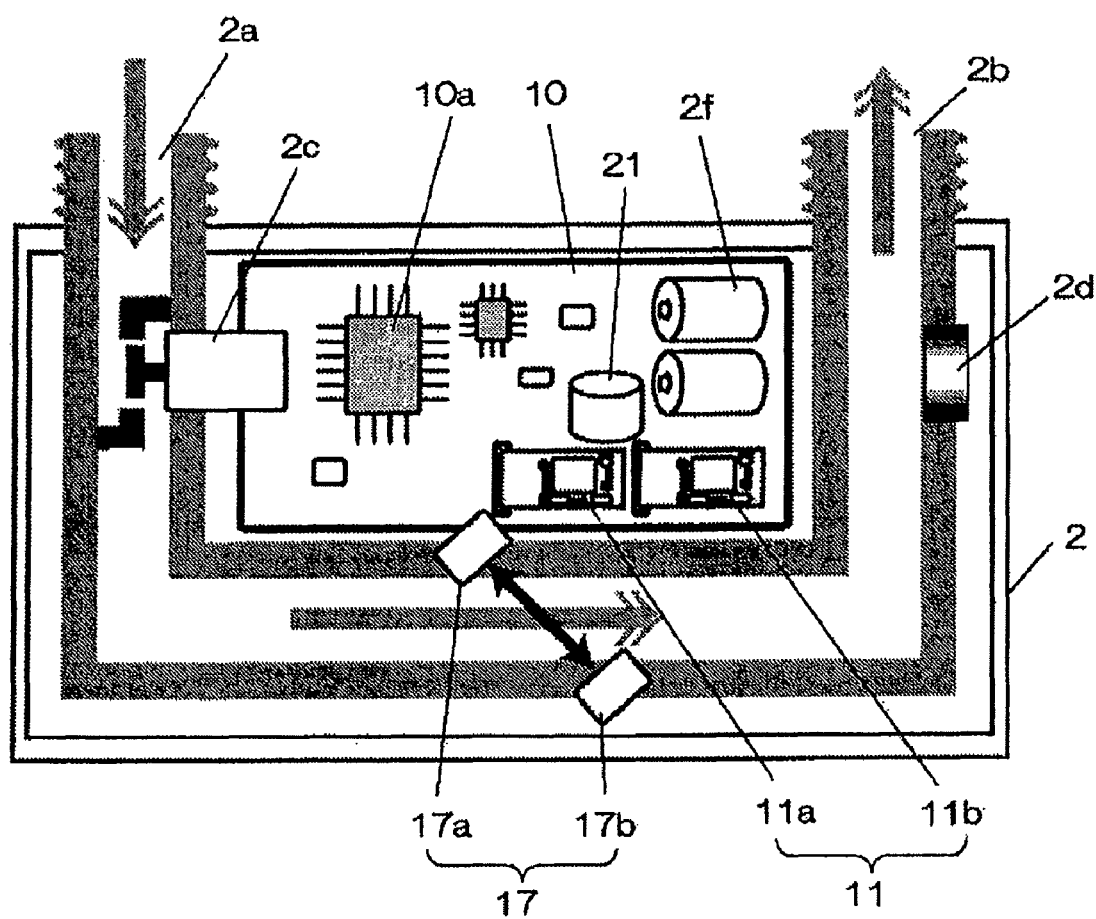
FIG. 6 is an internal configuration drawing of the gas appliance monitoring apparatus
Figure 7:
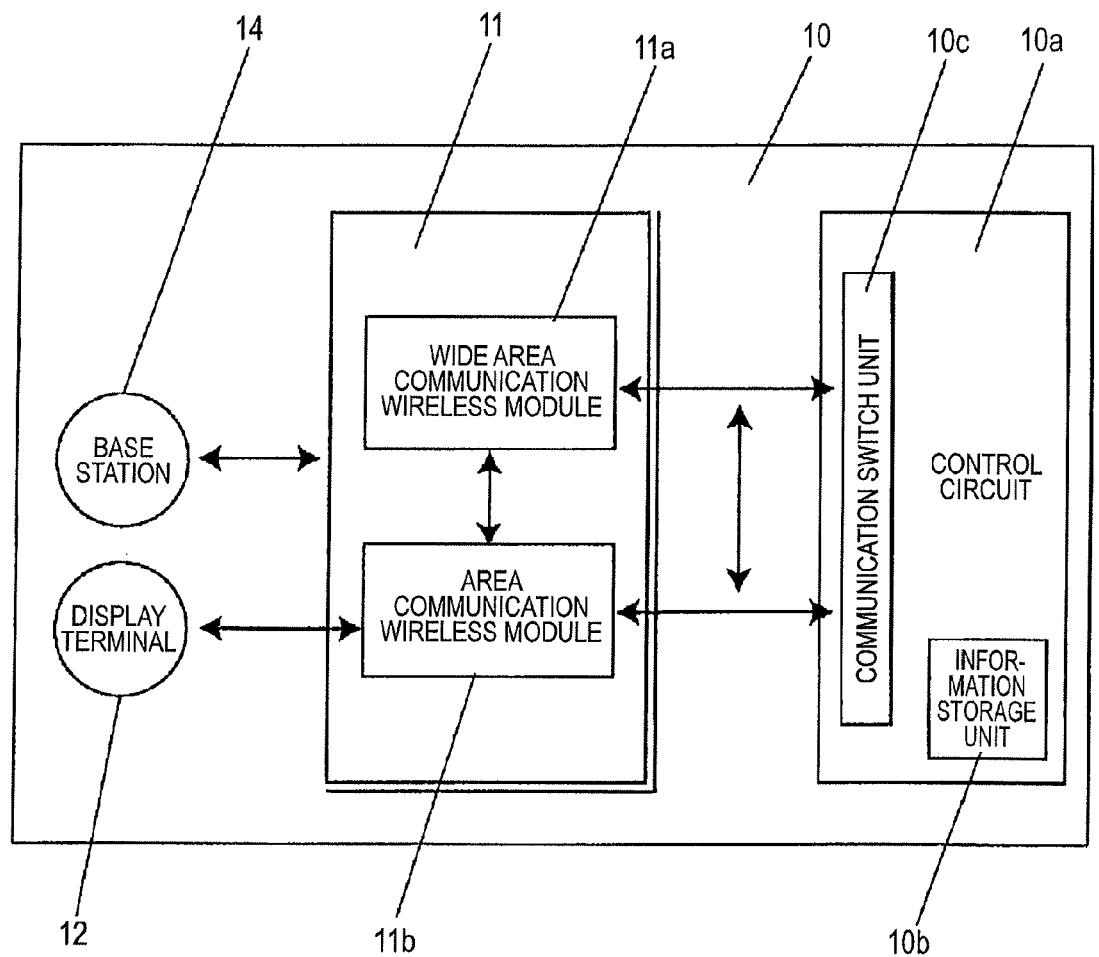
FIG. 7 is a block diagram of a control circuit board of the gas appliance monitoring apparatus.

FIG. 1 is a general configuration drawing of a communication mode between a gas meter and a base station and a customer house in an embodiment of the invention, FIG. 2 is a drawing to show a communication mode with specific gas appliances in a home in a gas appliance monitoring apparatus, FIG. 3 is a configuration drawing of an appliance wireless module in the gas appliance monitoring apparatus, FIG. 4 is a control block diagram of an appliance detection unit in the gas appliance monitoring apparatus, FIG. 5 is a drawing to show the appearance and the components of the gas appliance monitoring apparatus, FIG. 6 is an internal configuration drawing of the gas appliance monitoring apparatus, and FIG. 7 is a block diagram of a control circuit board of the gas appliance monitoring apparatus.

In FIG. 1, first, a plurality of gas appliances connected to gas piping after passing through a gas meter 2 and a communication function possessed by the gas meter 2 will be discussed.

The gas meter 2 is installed in the entrance portion of a gas supplying pipe 1 in each home and a branch is made from gas piping 3 after passing through the gas meter 2 to locations where various gas appliances used in the home for supplying gas. For example, a gas water heater 4 is installed outdoor and hot water generated in the gas water heater 4 is supplied through water piping to a hot water tap 5 in a kitchen, a bath 6 where a bath tub and a shower are installed, and floor heating 7 installed in a living room, etc., and various use modes are formed.

Indoors, gas is supplied to a gas cooker 8 installed in a kitchen and a gas fan heater 9 installed in a living room, a bedroom, etc., and is used where appropriate.

When the installed gas appliance is used and consumption of gas occurs, the usage amount is measured with the gas meter 2 and the data is cumulatively stored every predetermined time period. The data stored in the gas meter 2 is subjected to predetermined information processing based on a periodic data request command from a gas company 15 and then is transmitted to a customer 13 and the gas company 15 as information of the gas rate, the gas usage amount, discount service provided by the gas company 15, etc.

As a transmission unit, a wireless module 11 integrally built in a control circuit board 10 forming a controller incorporated in the gas meter 2 as shown in FIG. 5 is used and is on-board on the control circuit board 10 detachably with a connector 10*d* and a gas meter installing no wireless module 11 and having no communication function or a gas meter installing the wireless module 11 and having the communication function can be selected and the gas meter 2 is made common and can be used regardless of the presence or absence of the communication function.

The wireless module 11 is made detachable, whereby even if the communication function is included, if a wireless module acquiring a communication standard is installed and the standard as a communication device need not be acquired in the gas meter main body and to change the gas meter, etc., comparatively flexible change is made possible without receiving any restriction.

As shown in FIG. 7, the wireless module 11 is made up of a wide area communication wireless module 11*a* having a 200-MHz communication frequency band, for example, different from a telephone line to communicate with the base station 14 and an area communication wireless module 11*b* having a 429-MHz specified low power wireless communication frequency band, for example, to communicate with a specific terminal 12 such as a TV 12*a*, a personal computer, or a mobile telephone 12*b* in the customer home 13 and an adjacent gas meter and further a specific gas appliance installed in the home. Upon reception of data from a control circuit 10*a* for calculating the gas usage amount or detecting an anomaly of an earthquake, gas leakage, etc., based on a flow rate signal and a sensor signal, further various pieces of information transmitted from the gas company 15 through the base station 14, further various pieces of information transmitted from the adjacent gas meter, or further appliance information transmitted from the specific gas appliance, the wireless module 11 changes a measurement mode corresponding to information about the gas rate or the gas usage amount or operation of a gas shut-off valve accompanying occurrence of an anomaly of an earthquake, gas leakage, etc., or occurrence of a pulsation event from the adjacent gas meter, for example, in response to the reception data and further if information is to be provided for the customer, such as gas supply management of the specific gas appliance, transmits data to the specific terminal 12 such as the TV 12a or the mobile telephone 12b in the customer home 13 using the area communication wireless module 11b and when appliance information is transmitted from the specific gas appliance, receives the information and inputs the information to the control circuit 10a.

Figure 8:
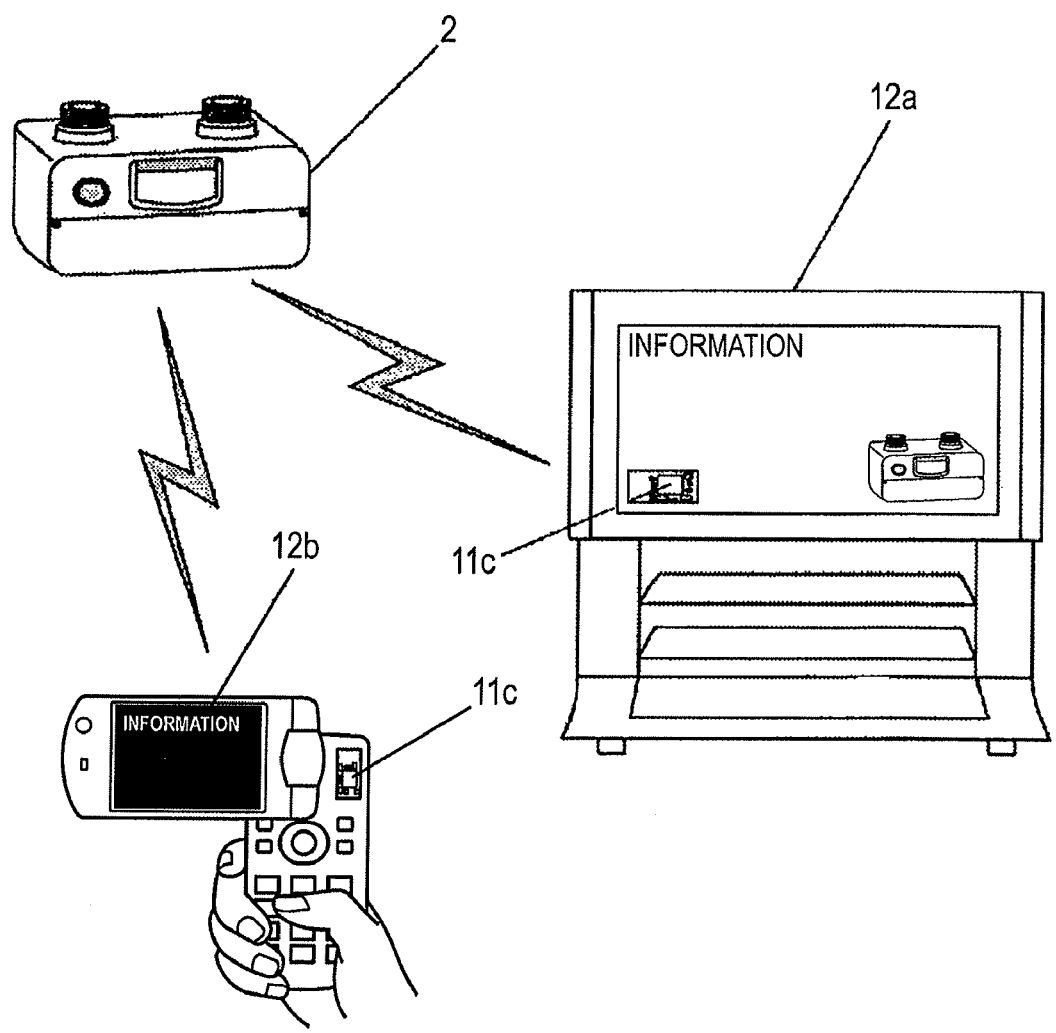
FIG. 8 is a drawing to show a communication mode between the gas appliance monitoring apparatus and a specific terminal.

As shown in FIG. 8, a wireless module 11c having the same communication frequency band as the area communication wireless module 11b incorporated in the gas meter 2 is also incorporated in or integrally attached to the specific terminal 12, whereby data transmitted from the gas meter 2 can be received and is displayed on a screen of the TV 12a or the mobile telephone 12b, whereby information can be transmitted directly to the customer and it becomes unnecessary to adopt an information transmission method of transmitting data to the gas company 15 from the gas meter 2 and sending information provided by processing the data in the gas company 15, for example, a postcard of rate notification, etc., to the customer by mail, etc., as before, so that the number of steps required for the notification work can be reduced and occurrence of the mail cost of notification postcards, etc., is also eliminated and the notification job can be rationalized, contributing to a decrease in the gas rate.

When various pieces of information are transmitted from the gas meter 2 to the specific terminal 12, a notification completion signal is sent from the area communication wireless module 11b to the wide area communication wireless module 11a, which then transmits the notification completion signal to the base station 14 and notifies the gas company 15 that information transmission to the customer is complete. In this case, preferably a response signal from the specific terminal 12 is received and the notification completion signal is transmitted; information transmission to the customer can be performed more reliably and a rational information transmission system can be constructed.

Next, a flow rate measurement processing unit incorporated in the control circuit 10a for measuring the gas flow rate, performing predetermined processing, and outputting flow rate information will be briefly discussed. As shown in FIGS. 5 and 6, the gas meter 2 has a gas entrance 2a and a gas exit 2b and is provided with a gas shut-off valve 2c for shutting off gas at the abnormal time and a pair of ultrasonic sensors 17 for measuring the gas flow rate in the gas flow path between the entrance and the exit and has a pressure sensor 2d for detecting gas pressure placed downstream from the ultrasonic sensors. The control circuit board 10 installing the control circuit 10a for calculating the gas flow rate based on the signal from the ultrasonic sensors 17 is placed so that a liquid crystal display 10e faces a display section 2e of the gas meter 2, and further a battery 2f for driving the control circuit 10a is housed. A recovery button 2g is placed as means for manually performing recovery operation after the gas shut-off valve 2c operates.

Figure 10:
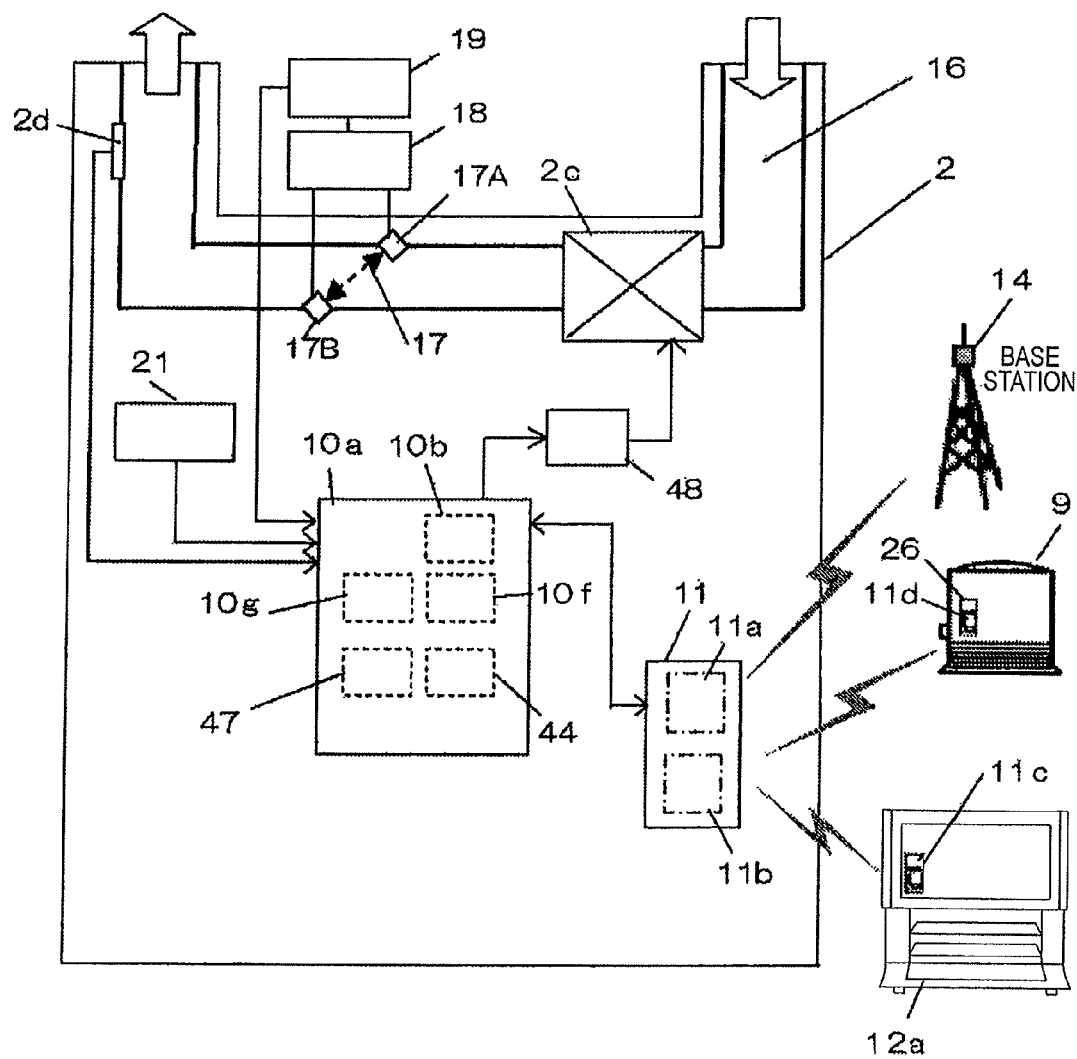
FIG. 10 is a control block diagram of the gas appliance monitoring apparatus.

The flow rate measurement section 17 and the control circuit 10a for measuring the gas flow rate may measure the propagation time changing in response to the flow rate flowing through the gas flow path where a pair of ultrasonic sensors is placed, thereby measuring the flow rate, for example, as shown in FIG. 10. The configuration will be discussed below: A first transceiver 17A for transmitting or receiving an ultrasonic wave and a second transceiver 17B for receiving or transmitting are placed in a flow direction and a measurement control section 18 having a switch unit forming a part of the control circuit 10a can switch between transmission and reception and the flow state of a fluid of gas, etc., is detected. Signals of the first transceiver 17A and the second transceiver 17B are processed and the flow rate is measured. Specifically, first the first transceiver 17A is driven by the measurement control section 18 and an ultrasonic wave is transmitted toward the second transceiver 17B, namely, from upstream to downstream. The signal received by the second transceiver 17B is amplified by an amplification unit provided in the measurement control section 18 and is compared with a reference signal and after a signal more than the reference signal is detected, the above-mentioned transmission and reception are repeated a predetermined number of times by a repetition unit provided in the measurement control section 18 and the time values are measured by a time count unit such as a timer counter provided in the measurement control section 18.

Next, transmission and reception of the first transceiver 17A and the second transceiver 17B are switched by the measurement control section 18 having the switch unit, an ultrasonic signal is transmitted from the second transceiver 17B to the first transceiver 17A, namely, from downstream to upstream, this transmission is repeated as described above, and the time values are measured. A signal processing unit 19 finds the flow rate value considering the size of the flow path 16 and the flow state of the fluid from the ultrasonic wave propagation time difference between the first transceiver 17A and the second transceiver 17B. The found flow rate data is accumulated in an information storage unit 10b and is stored as cumulative data every predetermined time period.

The shut-off valve 2c for shutting off the flow of gas at the abnormal time is provided in the flow path 16 where the flow rate measurement section 17 is placed and if the flow rate value found by the signal processing unit 19 is abnormally many or is detected exceeding the usually considered use time, it is determined that an anomaly occurs, and the shut-off valve 2c is operated for shutting off the gas flow path 16.

If an earthquake or shock signal is input from a seismoscope or a signal of an abnormal gas pressure is input from the pressure sensor 2d, the shut-off valve 2c is operated through the control circuit 10a for shutting off the gas flow path 16 and a center is notified.

Next, an example of information transmission using the wireless module 11 incorporated in the gas meter 2 will be discussed. First, if a meter reading command is transmitted from the gas company 15 in a wide area communication frequency band (200 MHz) through the base station 14, the wide area communication wireless module 11a incorporated in the gas meter receives the command and sends the meter reading command information to the control circuit 10a installed on the same board. The flow rate data measured in the flow rate measurement unit is accumulated in the control circuit 10a every predetermined time period and the cumulative data or rate data information into which the cumulative data is converted is stored in the information storage unit 10b. When the meter reading command information from the gas company 15 is input, the control circuit 10a sends the flow rate cumulative data or the rate data information into which the cumulative data is converted, in the information storage unit 10b through a communication switch unit 10c to the area communication wireless module 11b and the wide area communication wireless module 11a and the wide area communication wireless module 11a transmits to the base station 14 in the wide area communication frequency band (200 MHz) and the meter reading information is transmitted using a leased line from the base station 14 to the gas company 15. The area communication wireless module 11b transmits to the wireless module 11c integrally attached to the specific terminal 12 such as the TV 12a in the specified low power wireless communication frequency band (429 MHz) and displays rate information and the usage amount, for example, as shown in FIG. 9(a) on the screen. Upon completion of the transmission to the specific terminal 12, a notification completion signal is transmitted to the gas company 15 for notifying the gas company that information transmission to the customer is complete, as described above.

If the cause is diagnosed in the case where the shut-off valve 2c operates because of an earthquake, shock, etc., and a recovery command from the gas company 15 is transmitted through the base station 14 in the wide area communication frequency band (200 MHz), the wide area communication wireless module 11a incorporated in the gas meter 2 receives the command and sends the recovery command information to the control circuit 10a installed on the same board. When the recovery command information is input, the control circuit 10a sends information concerning recovery work stored in the information storage unit 10b through the communication switch unit 10c to the area communication wireless module 11b, which then transmits the information to the wireless module 11c integrally attached to the display terminal 12 such as the TV 12a in the specified low power wireless communication frequency band (429 MHz) and displays a recovery work procedure, for example, as shown in FIG. 9 (b) on the screen. Upon completion of the transmission to the display terminal 12, a notification completion signal is transmitted to the gas company 15 for notifying the gas company that information transmission to the customer is complete, as described above.

As described above, the control circuit 10a has the communication switch unit 10c to select the wireless modules different in communication frequency band corresponding to the party to communicate with in response to the information to be transmitted; for example, for a meter reading command from the gas company 15, the information stored in the information storage unit 10b needs to be transmitted to the gas company 15 and the specific terminal 12 according to the information received in the wide area communication wireless module 11a, in which case the wide area communication wireless module 11a having the 200-MHz communication frequency band, for example, and the area communication wireless module 11b having the 429-MHz specified low power wireless communication frequency band, for example, are selected and for a recovery command from the gas company 15, the information stored in the information storage unit 10b needs only to be transmitted to the specific terminal 12, in which case the area communication wireless module 11b having the 429-MHz specified low power wireless communication frequency band, for example, may be selected.

The wide area communication wireless module 11a and the area communication wireless module 11b may be provided separately or may be made a common wireless module and the communication frequency band may be switched between the wide area communication frequency band and the specified low power wireless communication frequency band. In the former, the communication switch unit 10c needs to select the wide area communication wireless module 11a and the area communication wireless module 11b; although there is the advantage that simultaneous communications are possible, there are the disadvantages of large installation space and an increase in the cost. In the latter, the communication switch unit 10c needs to switch the communication frequency band in response to the communicating party; although there are the advantages of small installation space and cost reduction, there are the disadvantages in that simultaneous communications cannot be conducted and alternate communications are applied.

Next, safety monitor of gas appliances in the gas meter having the communication function as described above will be discussed. Generally, as a device for limiting the continuous use time to prevent an accident caused by forgetting to turn off a gas appliance, etc., a device for setting the continuous use time in response to the flow rate and shutting off gas when the continuous use time has elapsed is known.

However, in the general appliance safety monitor described above, the continuous use time is uniformly set in response to the gas flow rate regardless of the type of gas appliance and the use time corresponding to the unique use of each gas appliance is not set; for example, a newest gas appliance with a full safety function and a gas appliance of 20 years past with a poor safety function, although they are gas appliances, are limited as the same use time if the flow rate range is the same. If the use time is limited with the newest gas appliance as the reference, the prevention time of forgetting to turn off the gas appliance of 20 years past is prolonged and the risk increases. In contrast, if the use time is limited with the gas appliance of 20 years past as the reference, an early turning-off phenomenon of the newest gas appliance occurs; this is a problem.

The embodiment is intended for solving the problem described above and provides a monitor unit using a different determination criterion by acquiring appliance information individually about a gas appliance which has an insufficient safety function in old type of gas appliance, etc., and needs to be monitored as it is discriminated from the newest gas appliance, changing the continuous use time as required based on the appliance information, and monitoring the gas appliance in addition to a method of monitoring the continuous use time by flow rate range.

Then, first, an acquisition unit of appliance information of a gas appliance which needs to be monitored as it is specially discriminated from others among gas appliances installed in a home will be discussed.

The conventional acquisition unit of appliance determination information uses flow rate information or acoustic information as disclosed in patent document 1 or 2 and is low in certainty and requires a complicated device. In the embodiment, the conventional problem is solved and an appliance information acquisition unit having a simple configuration and high in certainty is provided.

Specifically, as shown in FIG. 3, an appliance information transmitter 26 includes an appliance wireless module 11d having the same communication frequency band as the area communication wireless module 11b incorporated in the gas meter 2, an appliance detection unit 22 for detecting occurrence of discharge noise accompanying high voltage discharge of an igniter in ignition operation always executed at the operation starting time of a gas appliance, converting it into an operation start signal of the appliance, and outputting the signal to the appliance wireless module 11d, and a drive battery power supply 23, wherein the appliance wireless module 11d and the appliance detection unit 22 are put into one piece on an appliance wireless module board 24 and are housed in a case 25 to form the appliance information transmitter 26.

The appliance information transmitter 26 is housed in the gas appliance or is attached to a proper position of the outer covering. At this time, it becomes necessary to set the appliance information transmitter at a position where discharge noise of an igniter can be detected. For example, as shown in FIG. 2, for the gas fan heater 9, discharge noise of an igniter 4a can be detected simply by attaching the appliance information transmitter 26 to the inside of the appliance or a proper position of the outer covering surface, and the operation start of the gas fan heater 9 can be detected without connecting to a controller of the gas fan heater 9 for receiving a signal. This means that the operation start of the appliance can be detected simply by placing the appliance information transmitter 26 in a location where the effect of discharge noise of the igniter 4a is received. Therefore, the appliance information transmitter can be set in any desired location and can be detachably housed and thus can be detached from a gas appliance not requiring transmission of appliance information and can be easily set at replacing, etc.

Since the ignition system of a gas appliance is almost the high voltage discharge type regardless of the type of appliance, the appliance detection unit 22 for detecting the discharge noise can detect the operation start of a gas appliance of an old type, such as an instantaneous water heater or a gas cooking appliance, in addition to the gas fan heater 9.

As a method of detecting the operation start of an appliance, in addition to detection of discharge noise mentioned above, temperature change occurring with the combustion operation of the appliance, for example, exhaust gas temperature, warm wind temperature, or warm water temperature is detected, whereby the operation start of the gas appliance can be detected without receiving a signal from the appliance controller. To form an appliance information transmitter in the temperature change detection method, a temperature sensor needs to be attached to a detection position and be connected up to a transmission unit.

In the embodiment, a method of detecting discharge noise will be discussed in detail with the control block diagram of FIG. 4.

When the gas fan heater 9 starts ignition operation, the igniter operates, discharge starts between electrodes connected to the high voltage output side, the supplied gas is ignited, and combustion starts. At this time, discharge noise is radiated to the surroundings accompanying a discharge phenomenon between the electrodes. The discharge noise is detected by a discharge noise detection unit 22a and if the discharge noise is detected, an operation start signal conversion unit 22b converts it into a predetermined operation start signal and inputs the signal to an operation start signal determination unit 11e of the appliance wireless module 11d for determining whether or not the signal is a normal operation start signal. If the determination result is normal, a signal is sent to an appliance information transmission unit 11f and a unique identification code of the gas fan heater 9 set in an identification code change unit 27 is given and is transmitted to the area communication wireless module 11b of the gas meter 2 as appliance information. According to the operation sequence, the operation start of the appliance can be detected without receiving a signal from the controller of the appliance, and the signal can be transmitted to the gas meter 2. If the discharge noise detection unit 22a detects more than once discharge noise in a short time, it is determined that the ignition operation is performed more than once because of an ignition mistake, and the flow rate data at the time can also be taken into consideration for suppressing output of an operation start signal.

Although the embodiment has been described by taking the gas fan heater 9 as an example, similar detection is also possible in any other gas appliance, needless to say.

Using the appliance information thus acquired and the instantaneous flow rate measurement function with the ultrasonic sensor, safety monitor providing a different determination criterion for a specific gas appliance and discriminating the specific gas appliance from other gas appliances can be executed.

Next, the whole safety monitor will be discussed with FIG. 11.

First, in usual appliance safety monitor, the instantaneous flow rate found by the flow rate measurement unit 17 with use of a gas appliance is sent to a flow rate range detection unit 40, which then detects which of previously classified flow rate ranges the instantaneous flow rate falls under. The continuous use time of the gas appliance in the detected flow rate range is measured by an operation time measurement unit 41 and is stored in a by-flow-rate-range operation time storage unit 42. Next, when the flow rate range detection unit 40 detects use stop of the corresponding gas appliance, the operation time stored in the by-flow-rate-range operation time storage unit 42 is determined the continuous use time and is stored in a by-flow-rate-range operation time determination unit 43. A continuous use time monitor unit 44 for monitoring the continuous use time by flow rate range varying depending on the type of gas appliance is thus formed.

A by-flow-rate-range use time storage table 45 previously storing the continuously usable time by flow rate range is provided and a comparison unit 46 makes a comparison as to whether or not the continuous use time stored in the by-flow-rate-range operation time determination unit 43 exceeds the value of the storage table and predetermined processing is performed in response to the comparison result. Thus, the continuously usable time is predetermined by flow rate range varying depending on the type of gas appliance and a by-flow-rate-range use time storage unit 47 storing the time is provided.

In the comparison unit 46, if the continuous use time exceeds predetermined allowable time, it is determined that abnormal use such as forgetting to turn off the gas appliance occurs and a shut-off signal is sent to a shut-off valve drive circuit 48 for performing shut-off operation of the shut-off valve 2c. A signal is also sent to the wide area communication wireless module 11a and the area communication wireless module 11b and continuous use time passage information is transmitted to the base station 14 and the specific terminal 12.

Accordingly, safety monitor with a good balance between ease of use and safety can be accomplished by the continuous use time monitor function with the long time use as the reference, such as forgetting to turn off the most recent gas appliance with a full safety function, etc.

However, if safety monitor of a gas appliance of an old type used for a long term is performed based on the reference, the possibility that abnormal overheating or abnormal combustion will be caused to occur within the allowable time of the continuously usable time is high and the safety function is not full in some cases, in which case the abnormal phenomenon continues.

Then, in the embodiment, the appliance information transmitter 26 is attached to an appliance which needs to be monitored with particular care among the gas appliances of old types, the continuous operation time of the specific gas appliance is monitored using appliance information sent from the appliance information transmitter 26, a determination is made based on a different determination value from the stored value in the by-flow-rate-range use time storage unit 47, for example, the allowable time determined by the type and the use time period of the specific appliance or the family structure of the user, etc., and the monitor level can be made strict.

Specifically, when the area communication wireless module 11b receives appliance information transmitted from the appliance information transmission unit 11f of the appliance information transmitter 26, a specific appliance monitor unit 10f of the control circuit 10a determines which gas appliance the operation start signal has been transmitted from by a specific appliance determination unit 33, detects by a flow rate change detection unit 34 from the point in time at which the flow rate changes to the increase side to the point in time at which the flow rate changes to the decrease side from the instantaneous flow rate value measured by the flow rate measurement unit 17 at the time, measures the time by an operation time measurement unit 35, and sends the result to a specific appliance operation time storage unit 36. The specific appliance operation time storage unit 36 finds an average flow rate value, for example, from the flow rate value measured by the flow rate measurement unit 17, determines that it is the operation time of the specific appliance, and sends it to a specific appliance operation time determination unit 37.

A comparison unit 39 compares the time with the continuous use time by specific appliance previously stored in a specific appliance continuous use time storage table 38 of a specific appliance use time storage unit 10*g* and when the specific appliance continuous operation time exceeds the continuous use time storage value, sends a shut-off signal to the shut-off valve drive circuit 48 for executing the shut-off operation of the shut-off valve 2*c* and also sends a signal to the wide area communication wireless module 11*a* and the area communication wireless module 11*b*, and continuous use time passage information is transmitted to the base station 14 and the specific terminal 12.

Accordingly, the continuous operation time accompanying actual combustion based on the acquired specific gas appliance information can be monitored and the time is compared with the determination value made higher than the preset monitor level, whereby the appropriate continuous use time of the gas appliance of old type which needs to be used with care can be determined and the determination result can be reported to the necessary party such as the base station, so that a dangerous state accompanying the long-time abnormal use situation caused by forgetting to turn off the gas appliance, etc., can be prevented reliably.

Figure 11:
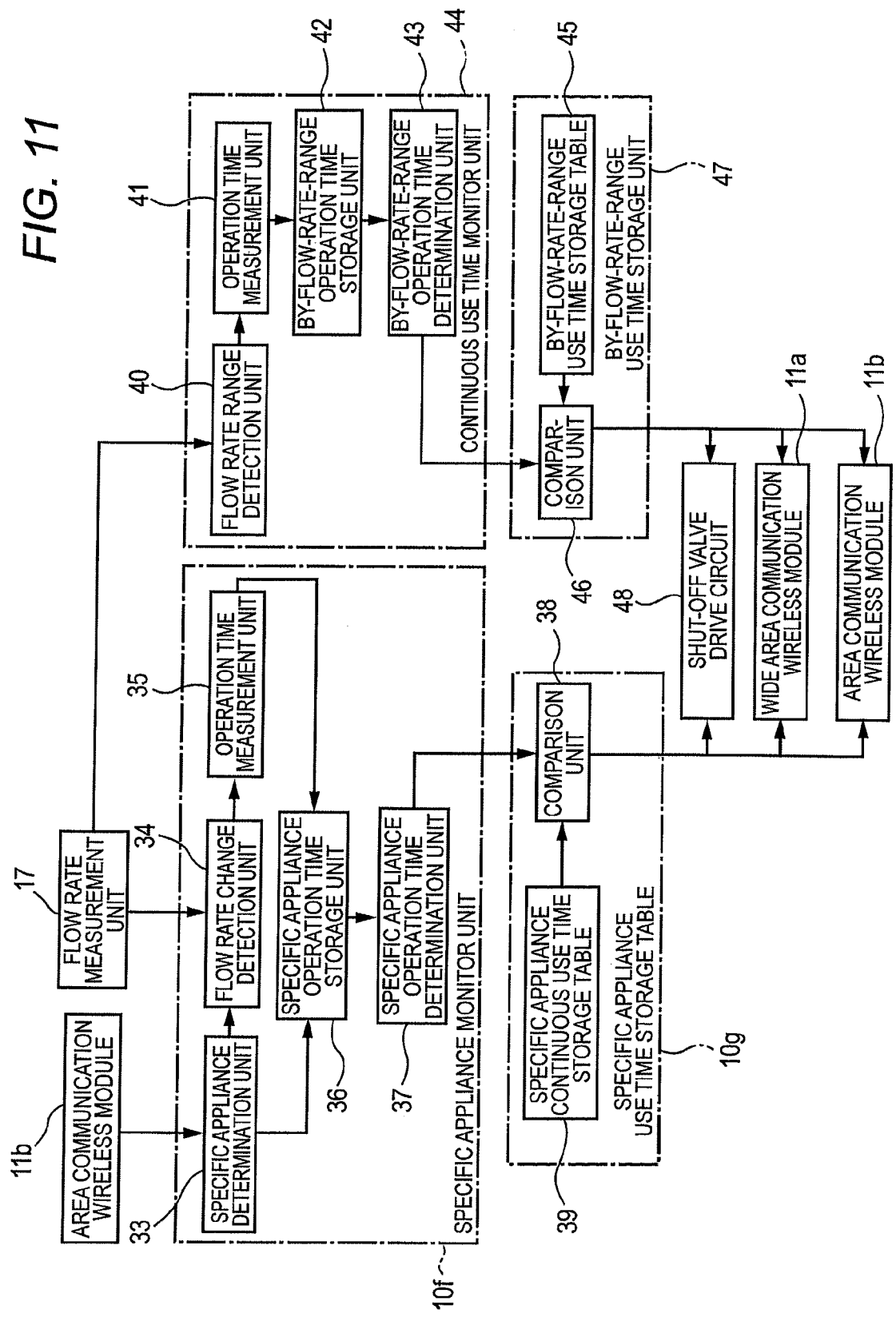
FIG. 11 is a block diagram of a control circuit of the gas appliance monitoring apparatus.
Figure 12:
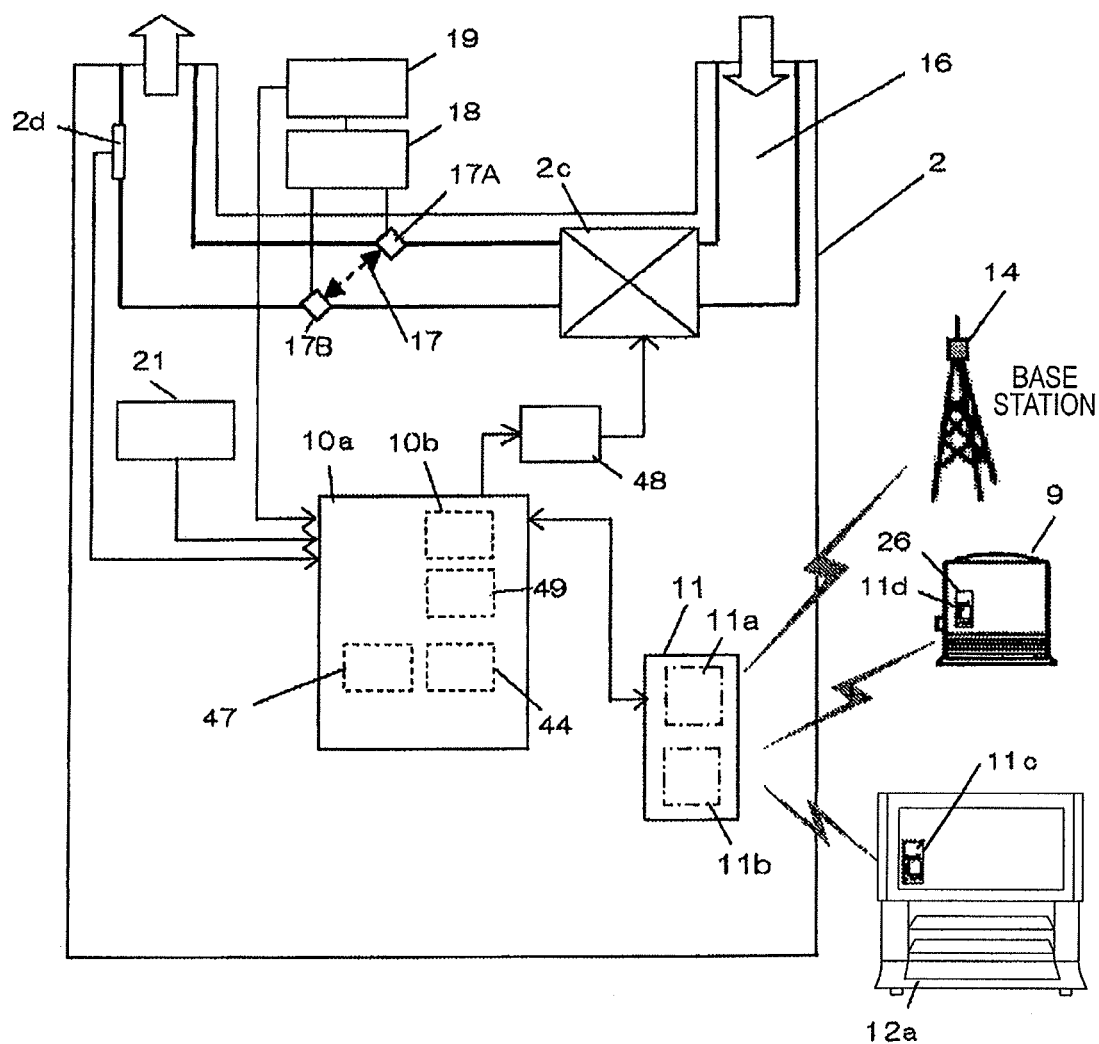
FIG. 12 is a control block diagram of a gas appliance monitoring apparatus in a different embodiment of the invention.
Figure 13:
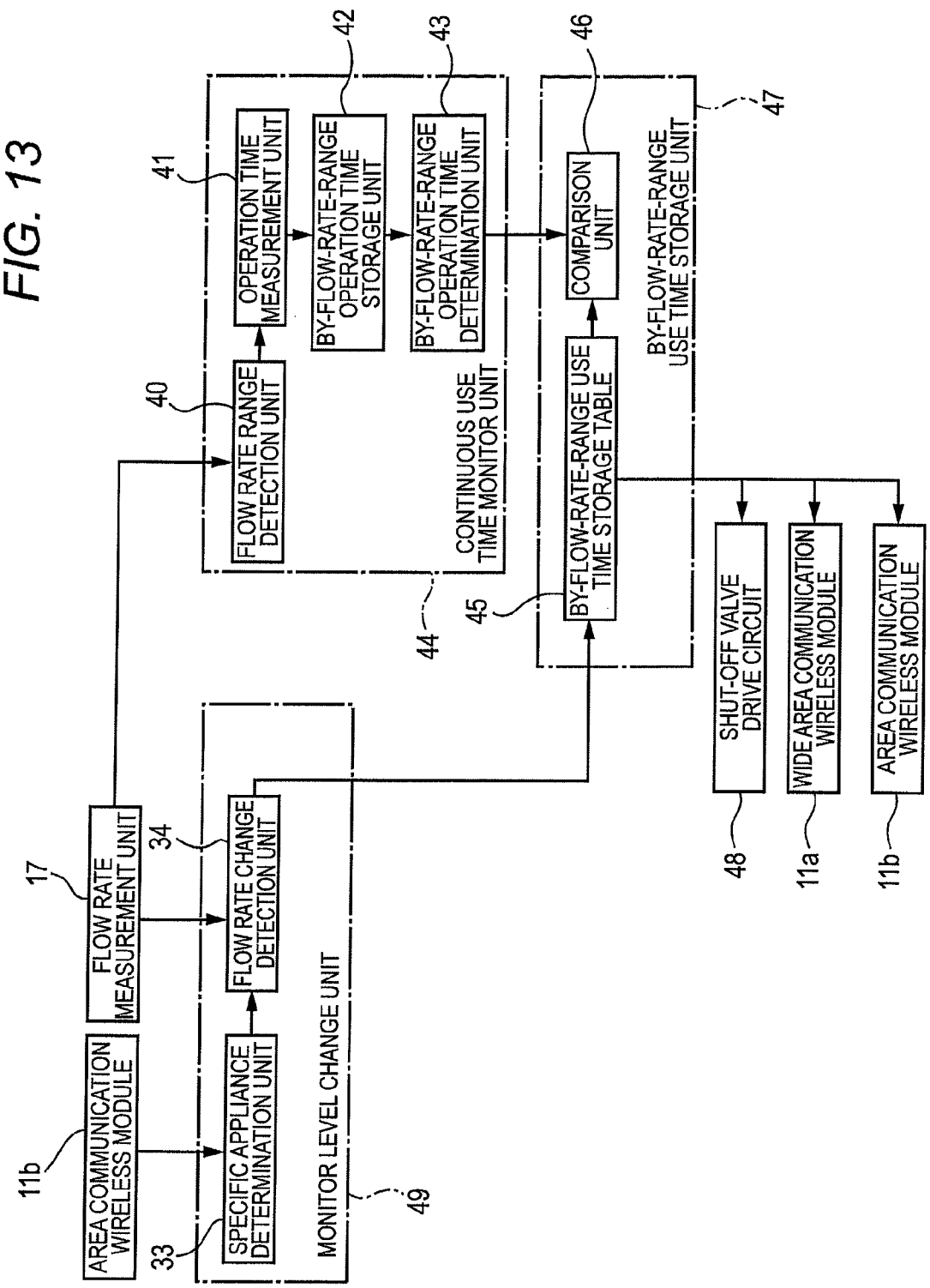
FIG. 13 is a block diagram of a control circuit of the gas appliance monitoring apparatus in the different embodiment of the invention.

FIGS. 12 and 13 show a different embodiment of safety monitor. Parts common to those of the embodiment in FIGS. 10 and 11 will not be discussed again.

In the embodiment, like the embodiment in FIGS. 10 and 11, an appliance information transmitter 26 is attached to an appliance which needs to be monitored with particular care among gas appliances of old types, a by-flow-rate-range use time storage table 45 of a by-flow-rate-range use time storage unit 47 is changed using appliance information sent from the appliance information transmitter 26, the continuous operation time of all gas appliances including a specific gas appliance is monitored after the post-changed storage table, a determination is made based on a different determination value from the stored value in the by-flow-rate-range use time storage unit 47 at the usual time, for example, the allowable time determined by the type and the use time period of the specific appliance or the family structure of the user, etc., and the monitor level can be made strict.

Specifically, when an area communication wireless module 11*b* receives appliance information transmitted from an appliance information transmission unit 11*f* of the appliance information transmitter 26, a monitor level change unit 49 of a control circuit 10*a* determines which gas appliance the operation start signal has been transmitted from by a specific appliance determination unit 33, detects by a flow rate change detection unit 34 from the point in time at which the flow rate changes to the increase side to the point in time at which the flow rate changes to the decrease side from the instantaneous flow rate value measured by a flow rate measurement unit 17 at the time, and sends the detection signal to the by-flow-rate-range use time storage unit 47. The by-flow-rate-range use time storage unit 47 determines that use of the specific appliance is started when a flow rate increase signal is sent from the flow rate change detection unit 34, changes the storage table to the storage table corresponding to the appliance information, determines that use of the specific appliance is stopped when a flow rate decrease signal is sent from the flow rate change detection unit 34, and restores the storage table to the usual storage table.

Accordingly, the continuous operation time of the gas appliance based on the acquired specific gas appliance information can be monitored and the time is compared with the determination value made higher than the preset monitor level, whereby appliance monitor in a time period during which the gas appliance of old type which needs to be used with care is used can be determined based on the appropriate continuous use time and the determination result can be reported to the necessary party such as the base station, so that a dangerous state accompanying the long-time abnormal use situation caused by forgetting to turn off the gas appliance, etc., can be prevented reliably.

In the embodiment described above, the wireless module 11 is integrally built in the control circuit board 10 forming the controller incorporated in the gas meter 2. That is, the wireless module 11 is incorporated in the gas meter 2. However, the wireless module 11 need not always be incorporated in the gas meter 2 and may be of a type wherein it is attached to the gas meter 2 later.

This application is based on Japanese Patent Application Nos. 2007-076332 and 2007-076333 filed on Mar. 23, 2007, which are incorporated herein by reference.

While the embodiments of the invention have been described, it is to be understood that the invention is not limited to the items disclosed in the embodiments and the invention also intends that those skilled in the art make changes, modifications, and applications based on the Description and widely known arts, and the changes, the modifications, and the applications are also contained in the scope to be protected.

INDUSTRIAL APPLICABILITY

According to the gas appliance monitoring apparatus of the invention, the operation start of a gas appliance can be detected without receiving a signal from the gas appliance controller and appliance determination is made possible using the information, so that various services using the appliance determination information are made possible and the gas appliance monitoring apparatus can also be applied to a combustion apparatus other than gas.

The invention claimed is:

1. A gas appliance monitoring apparatus for monitoring a use state of a plurality of gas appliances connected to piping after passing through a gas meter, said gas appliance monitoring apparatus installing a wireless module capable of transmitting and receiving directly to and from a plurality of parties using a communication line other than a telephone line, wherein the gas meter comprises a flow rate measurement unit for measuring a gas flow rate, a gas shut-off valve for shutting off a gas flow path at an abnormal time, a control circuit for performing predetermined processing based on a measurement result of the flow rate measurement unit and outputting a flow rate information, a meter wireless module for transmitting and receiving information to and from a plurality of parties, and a communication switch unit for switching a communication frequency band depending on the parties, wherein the meter wireless module has at least a communication frequency band with a base station and a communication frequency band with a specific gas appliance, wherein the specific gas appliance is provided with an appliance information transmitter for detecting an operation start of the appliance and transmitting appliance information to the gas meter, wherein the appliance information transmitter comprises an appliance detection unit for detecting the operation start of the appliance without receiving a signal from a gas appliance controller and an appliance wireless module for transmitting an appliance operation start signal from the appliance detection unit to the gas meter in a predetermined communication frequency band, wherein the control circuit has a continuous use time monitor unit for monitoring a continuous operation time of the appliance based on the flow rate information, a by-flow-rate-range continuous use time storage unit presetting and storing a continuously usable time by a flow rate range, a specific appliance monitor unit for monitoring a continuous operation time of the specific gas appliance based on the appliance information transmitted from the appliance information transmitter and the flow rate information, and a specific appliance use time storage unit presetting and storing a continuously usable time of the specific gas appliance, and wherein when the continuous operation time monitored by the continuous use time monitor unit reaches a stored value in the by-flow-rate-range continuous use time storage unit, a predetermined processing mode is executed and when the continuous operation time monitored by the specific appliance monitor unit reaches a stored value in the specific appliance use time storage unit, the gas shut-off valve is operated on a top-priority basis for stopping supply of the gas and the meter wireless module is used to transmit the continuous use time passage information at least to the base station.

2. A gas appliance monitoring apparatus for monitoring a use state of a plurality of gas appliances connected to piping after passing through a gas meter, said gas appliance monitoring apparatus installing a wireless module capable of transmitting and receiving directly to and from a plurality of parties using a communication line other than a telephone line, wherein the gas meter comprises a flow rate measurement unit for measuring a gas flow rate, a gas shut-off valve for shutting off a gas flow path at an abnormal time, a control circuit for performing predetermined processing based on a measurement result of the flow rate measurement unit and outputting a flow rate information, a meter wireless module for transmitting and receiving information to and from a plurality of parties, and a communication switch unit for switching a communication frequency band depending on the parties, wherein the meter wireless module has at least a communication frequency band-with a base station and a communication frequency band with a specific gas appliance, wherein the specific gas appliance is provided with an appliance information transmitter for detecting an operation start of the appliance and transmitting appliance information to the gas meter, wherein the appliance information transmitter comprises an appliance detection unit for detecting an operation start of the appliance without receiving a signal from a gas appliance controller and an appliance wireless module for transmitting an appliance operation start signal from the appliance detection unit to the gas meter in a predetermined communication frequency band, wherein the control circuit has a continuous use time monitor unit for monitoring a continuous operation time of the appliance based on the flow rate information, a by-flow-rate-range continuous use time storage unit presetting and storing a continuously usable time by a flow rate range, and a monitor level change unit for changing a stored value in the by-flow-rate-range continuous use time storage unit based on the appliance information transmitted from the appliance information transmitter, and wherein when the continuous operation time monitored by the continuous use time monitor unit reaches the stored value in the by-flow-rate-range continuous use time storage unit, a predetermined processing mode is executed and when the monitor level change unit changes the stored value, the gas appliance is monitored using a post-changed stored value until a change reset processing is executed.

3. The gas appliance monitoring apparatus as claimed in claim 1, wherein the meter wireless module conducts communications using a communication frequency band different from a communication wireless module with the base station and a communication wireless module with the specific gas appliance, and wherein the communication wireless module with the specific gas appliance is an area communication wireless module having a specified low power wireless communication frequency band and the communication wireless module with the base station is a wide area communication wireless module having a wide area communication frequency band.

4. The gas appliance monitoring apparatus as claimed in claim 1, wherein the area communication wireless module can also conduct communications with a specific terminal in addition to communications with the specific gas appliance and when the continuous use time passage information is originated, transmits to the specific terminal.

5. The gas appliance monitoring apparatus as claimed in claim 1, wherein the appliance detection unit comprises a discharge noise detection unit for detecting discharge noise for ignition of the specific gas appliance and an operation start signal conversion unit for converting a signal from the discharge noise detection unit into an appliance operation start signal and outputting the signal to the appliance wireless module.

6. The gas appliance monitoring apparatus as claimed in claim 1, wherein the appliance detection unit comprises a temperature change detection unit for detecting temperature change occurring with the operation of the specific gas appliance and an operation start signal conversion unit for converting a signal from the temperature change detection unit into an appliance operation start signal and outputting the signal to the appliance wireless module.

7. The gas appliance monitoring apparatus as claimed in claim 1, wherein the appliance wireless module comprises an operation start signal determination unit for determining whether or not the operation start signal from the appliance detection unit is normal, an identification code change unit for setting or changing a unique identification code for identifying each appliance, and an appliance information transmission unit for transmitting the operation start signal and appliance information to which the identification code is given to the gas meter if the determination result of the operation start signal determination unit is normal.

8. The gas appliance monitoring apparatus as claimed in claim 1, wherein the specific appliance monitor unit comprises an appliance determination unit for determining which gas appliance is used when the appliance information is transmitted from the appliance information transmitter, a flow rate change detection unit for detecting decrease side flow rate change from increase side flow rate change based on the flow rate information at the time, and an operation time measurement unit for measuring the time.

9. The gas appliance monitoring apparatus as claimed in claim 1, wherein the specific appliance use time storage unit comprises a continuously usable time storage table storing the continuously usable time varying depending on the type of specific gas appliance in an operation time table of a plurality of stages and a comparison unit for making a comparison between the continuous operation time monitored by the specific appliance monitor unit and the stored value in the storage table and outputs a signal to the wide area communication wireless module or/and the area communication wireless module when the continuous operation time exceeds the stored value.

10. The gas appliance monitoring apparatus as claimed in claim 2, wherein the monitor level change unit comprises an appliance determination unit for determining which gas appliance is used when the appliance information is transmitted from the appliance information transmitter and a flow rate change detection unit for detecting decrease side flow rate change from increase side flow rate change based on the flow rate information at the time.

11. The gas appliance monitoring apparatus as claimed in claim 2, wherein the by-flow-rate-range continuous use time storage unit comprises a continuously usable time storage table storing the continuously usable time corresponding to the specific gas appliance based on the appliance information of the appliance determination unit and increase side flow rate change information of the flow rate change detection unit as an operation time table and a comparison unit for making a comparison between the continuous operation time monitored by the continuous use time monitor unit and the stored value in the storage table and outputs a signal to the wide area communication wireless module or/and the area communication wireless module when the continuous operation time exceeds the stored value.

12. The gas appliance monitoring apparatus as claimed in claim 2, wherein the meter wireless module conducts communications using a communication frequency band different from a communication wireless module with the base station and a communication wireless module with the specific gas appliance, and wherein the communication wireless module with the specific gas appliance is an area communication wireless module having a specified low power wireless communication frequency band and the communication wireless module with the base station is a wide area communication wireless module having a wide area communication frequency band.

13. The gas appliance monitoring apparatus as claimed in claim 2, wherein the area communication wireless module can also conduct communications with a specific terminal in addition to communications with the specific gas appliance and when the continuous use time passage information is originated, transmits to the specific terminal.

14. The gas appliance monitoring apparatus as claimed in claim 2, wherein the appliance detection unit comprises a discharge noise detection unit for detecting discharge noise for ignition of the specific gas appliance and an operation start signal conversion unit for converting a signal from the discharge noise detection unit into an appliance operation start signal and outputting the signal to the appliance wireless module.

15. The gas appliance monitoring apparatus as claimed in claim 2, wherein the appliance detection unit.cndot.comprises a temperature change detection unit for detecting temperature change occurring with the operation of the specific gas appliance and an operation start signal conversion unit for converting a signal from the temperature change detection unit into an appliance operation start signal and outputting the signal to the appliance wireless module.

16. The gas appliance monitoring apparatus as claimed in claim 2, wherein the appliance wireless module comprises an operation start signal determination unit for determining whether or not the operation start signal from the appliance detection unit is normal, an identification code change unit for setting or changing a unique identification code for identifying each appliance, and an appliance information transmission unit for transmitting the operation start signal and appliance information to which the identification code is given to the gas meter if the determination result of the operation start signal determination unit is normal.

\* \* \* \* \*